(12) United States Patent
Furukawa

(10) Patent No.: US 8,203,613 B2
(45) Date of Patent: Jun. 19, 2012

(54) IMAGE ACQUISITION APPARATUS, IMAGE PROCESSING APPARATUS, IMAGE ACQUISITION SYSTEM, AND IMAGE PROCESSING PROGRAM

(75) Inventor: Eiji Furukawa, Saitama (JP)

(73) Assignee: Olympus Corporation (JP)

( * ) Notice: Subject to any disclaimer, the term of this patent is extended or adjusted under 35 U.S.C. 154(b) by 659 days.

(21) Appl. No.: 12/389,793

(22) Filed: Feb. 20, 2009

(65) Prior Publication Data

US 2009/0153683 A1   Jun. 18, 2009

Related U.S. Application Data

(63) Continuation of application No. PCT/JP2007/067012, filed on Aug. 31, 2007.

(30) Foreign Application Priority Data

Sep. 11, 2006   (JP) ................................. 2006-245975

(51) Int. Cl.
*H04N 5/228* (2006.01)
*G06K 9/36* (2006.01)

(52) U.S. Cl. ............. 348/208.13; 348/208.1; 348/208.4; 382/166; 382/236

(58) Field of Classification Search ............ 348/208.99, 348/208.1, 208.4, 208.5, 208.13, 222.1; 382/162, 382/164, 166, 167, 232, 235, 236, 254
See application file for complete search history.

(56) References Cited

U.S. PATENT DOCUMENTS

| | | | | |
|---|---|---|---|---|
| 7,515,747 B2* | 4/2009 | Okutomi et al. | ............. | 382/167 |
| 2004/0013319 A1* | 1/2004 | Wenstrand et al. | ............ | 382/299 |
| 2004/0126019 A1 | 7/2004 | Ikebe et al. | ................... | 382/232 |
| 2005/0213812 A1* | 9/2005 | Ishikawa et al. | ............... | 382/166 |
| 2010/0033602 A1* | 2/2010 | Okada et al. | ................... | 348/241 |

FOREIGN PATENT DOCUMENTS

| | | |
|---|---|---|
| JP | 9-036749 | 2/1997 |
| JP | 2828138 | 9/1998 |

(Continued)

OTHER PUBLICATIONS

International Search Report mailed Dec. 11, 2007 in corresponding PCT International Application No. PCT/JP2007/067012, with an English translation thereof.

(Continued)

*Primary Examiner* — David Ometz
*Assistant Examiner* — Peter Chon
(74) *Attorney, Agent, or Firm* — Ostrolenk Faber LLP

(57) ABSTRACT

In an image acquisition apparatus, RAW data obtained in image acquisition with an imager in which a color filter is disposed in a front face is divided into each identical color by a RAW data dividing unit, a compression coding processing unit produces coded data of each color by compressing the RAW data at a compression rate controlled for each color, and the coded data of each color is recorded in a recording unit. A motion compensation unit compensates a relative positional relationship between frames by estimating a motion of a subject between frames of plural images, using specific color division coded data which is decoded by the compression coding processing unit and a RAW format data reproducing unit, the specific color division coded data being coded data of a color close to a peak of spectral sensitivity of human vision in the coded data of each color.

11 Claims, 17 Drawing Sheets

FOREIGN PATENT DOCUMENTS

| | | |
|---|---|---|
| JP | 11-168688 | 6/1999 |
| JP | 2001-036809 | 2/2001 |
| JP | 2004-034532 | 2/2004 |
| JP | 2004-128583 | 4/2004 |
| JP | 2005-217954 | 8/2005 |
| JP | 2006-033088 | 2/2006 |
| JP | 2006-050516 | 2/2006 |

OTHER PUBLICATIONS

English language translation of International Preliminary Report on Patentability (Chapter I or Chapter II of the Patent Cooperation Treaty) in corresponding International Application No. PCT/JP2007/067012 mailed Mar. 26, 2009.

* cited by examiner

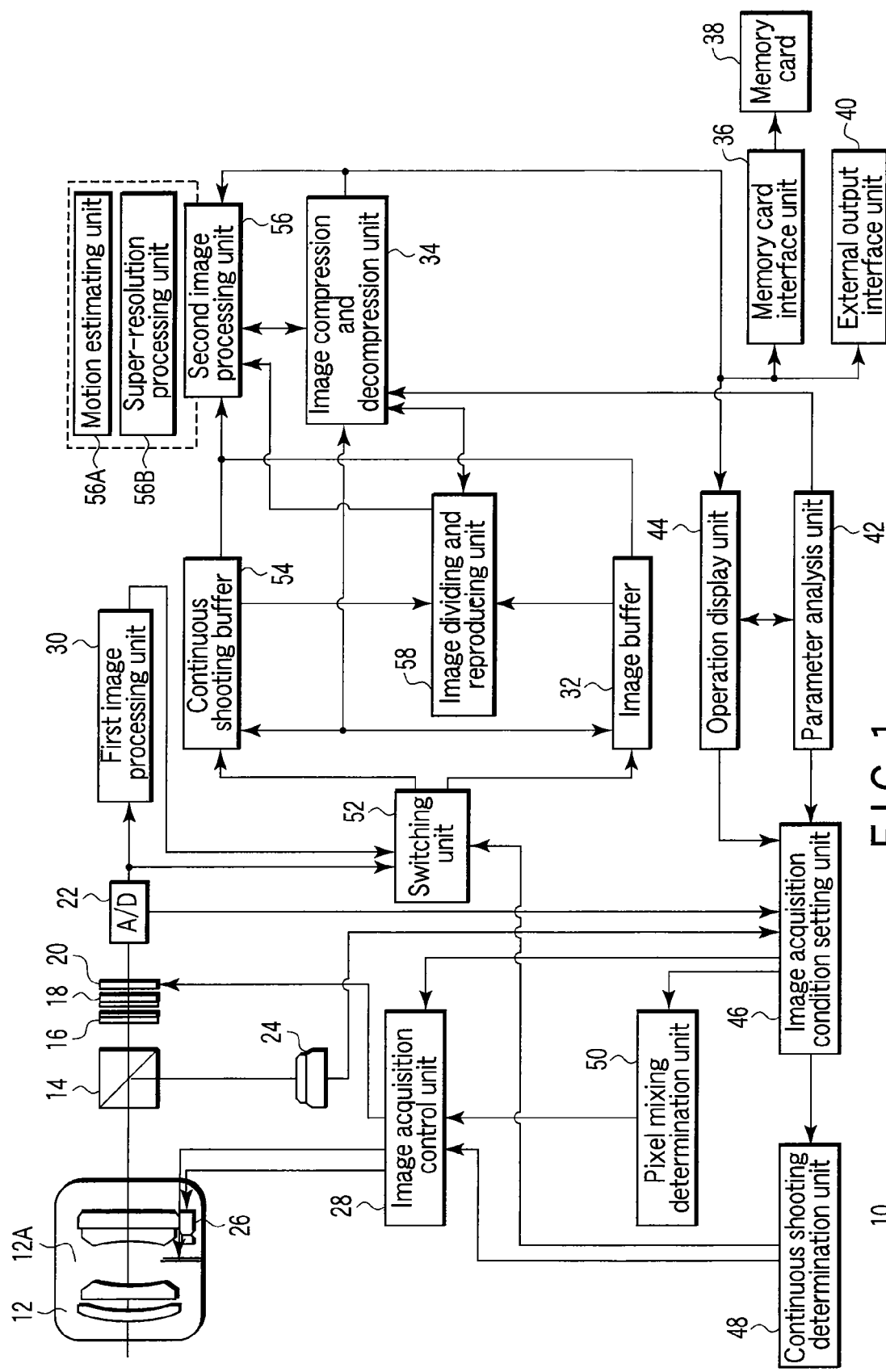
F I G. 1

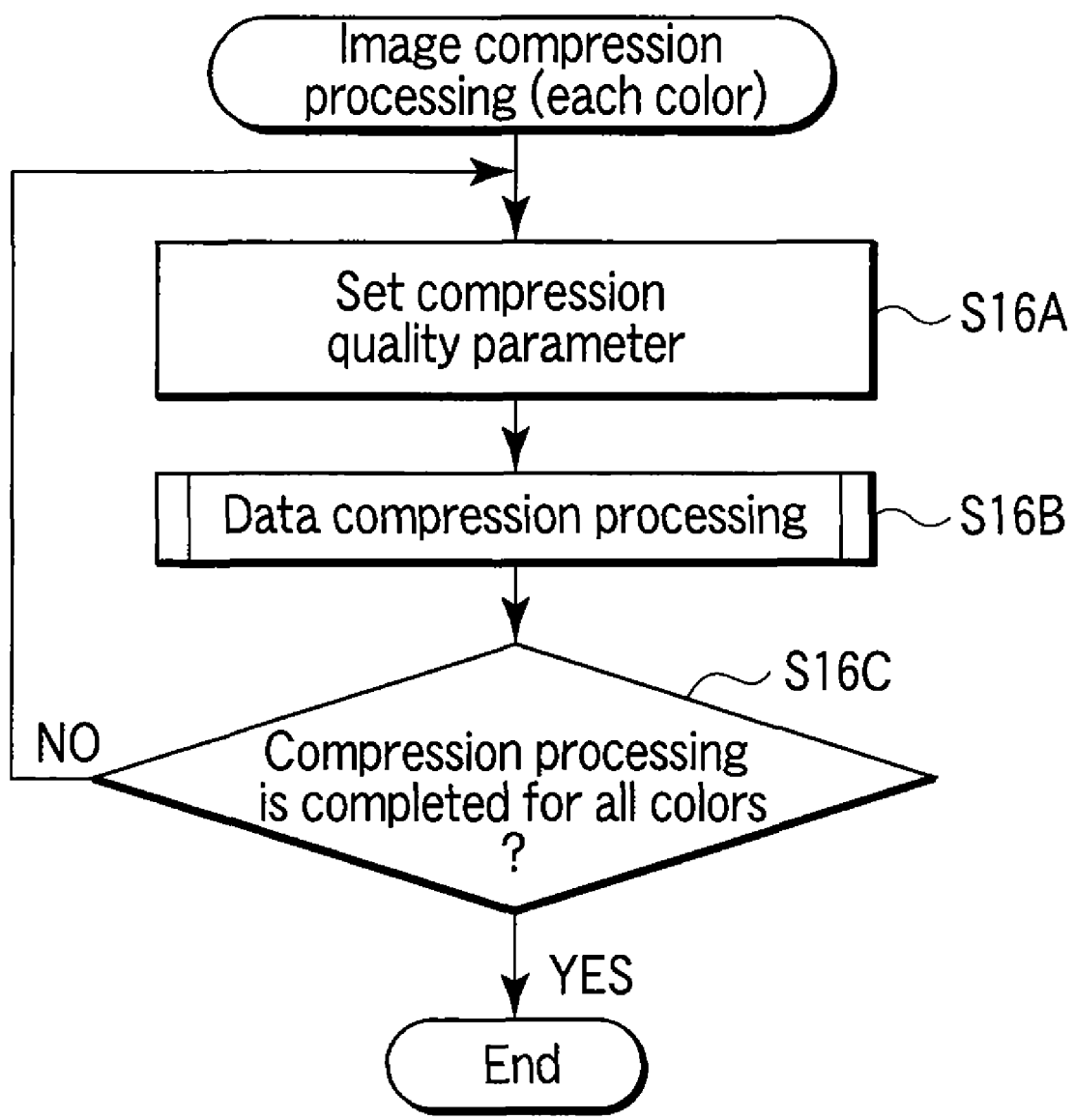
F I G. 7

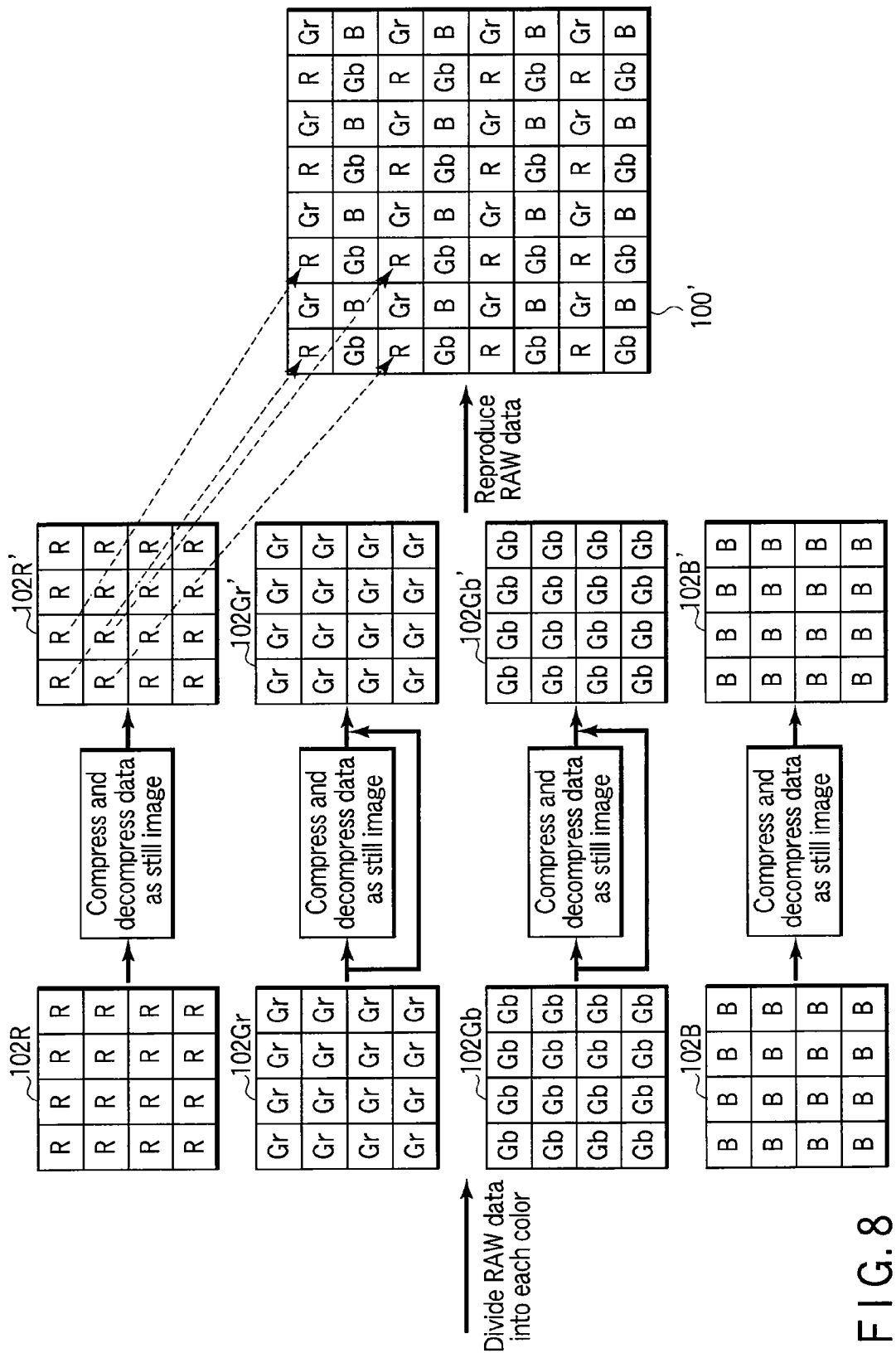
F I G. 8

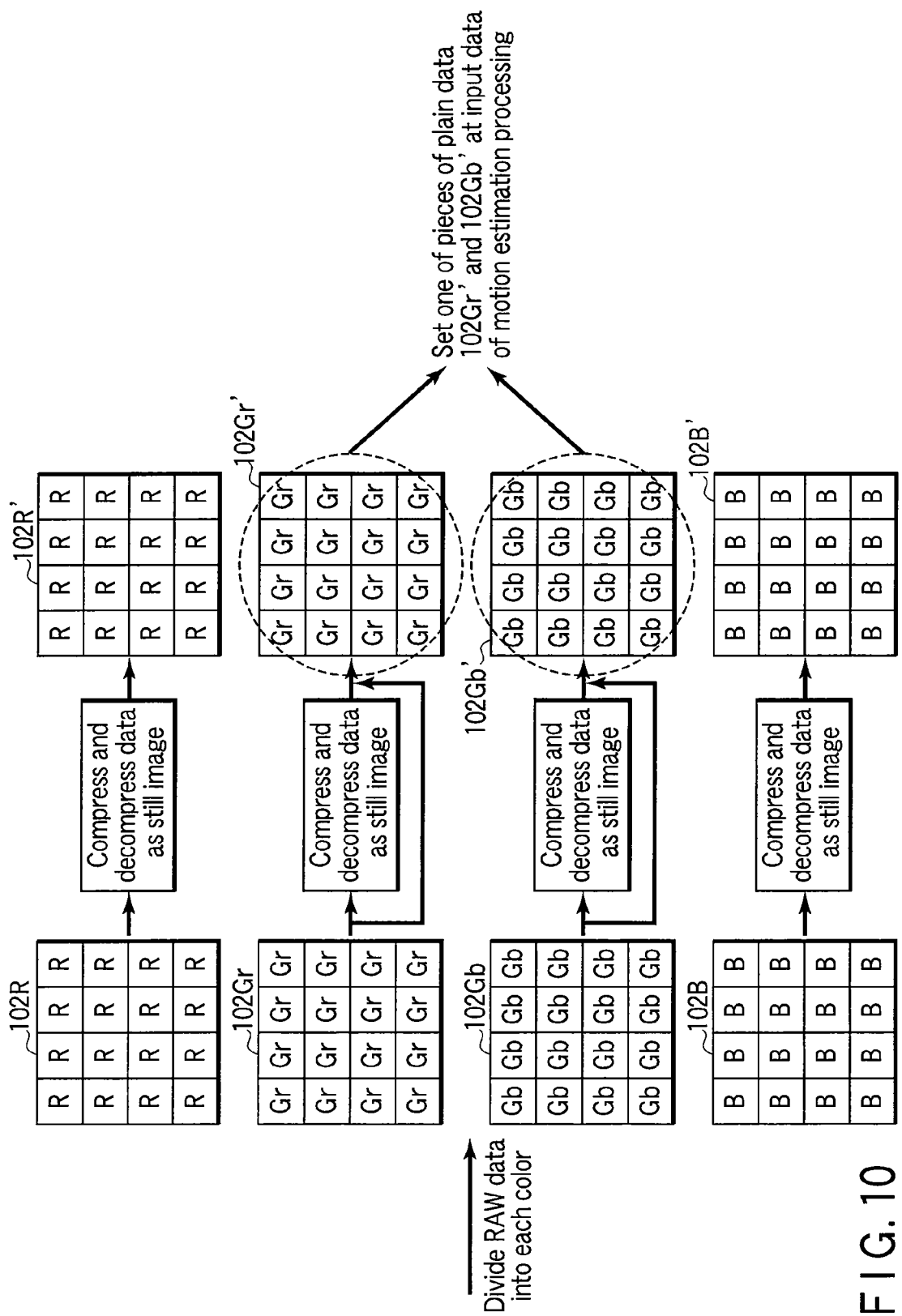
F I G. 10

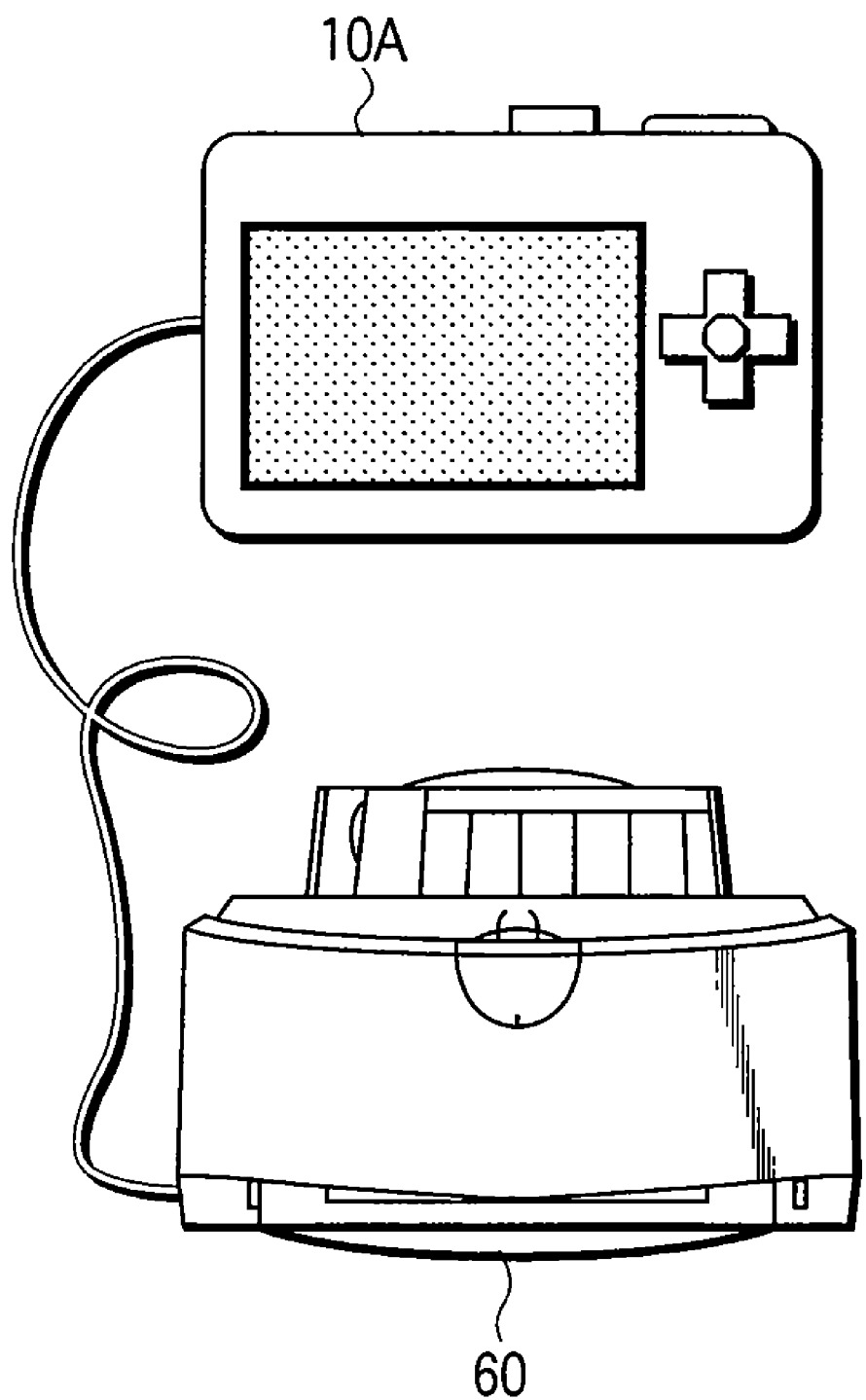
F I G. 16

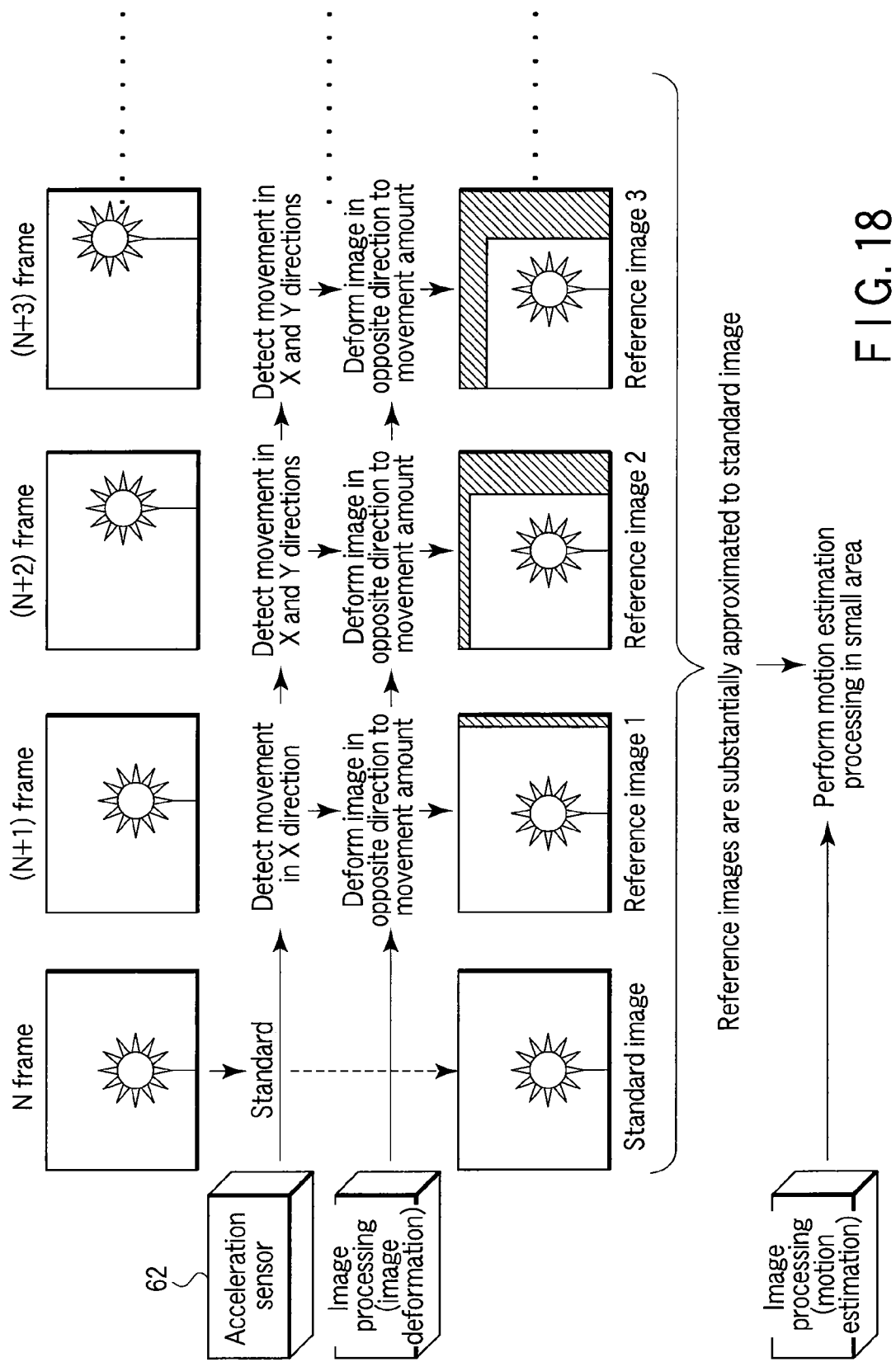

IMAGE ACQUISITION APPARATUS, IMAGE PROCESSING APPARATUS, IMAGE ACQUISITION SYSTEM, AND IMAGE PROCESSING PROGRAM

CROSS REFERENCE TO RELATED APPLICATIONS

This is a Continuation Application of PCT Application No. PCT/JP2007/067012, filed Aug. 31, 2007, which was published under PCT Article 21(2) in Japanese.

This application is based upon and claims the benefit of priority from prior Japanese Patent Application No. 2006-245975, filed Sep. 11, 2006, the entire contents of which are incorporated herein by reference.

BACKGROUND OF THE INVENTION

1. Field of the Invention

The present invention relates to an image acquisition apparatus, an image processing apparatus, an image acquisition system, and an image processing program for producing a high-quality image while reducing a burden on hardware in image processing for achieving high resolution of an image.

2. Description of the Related Art

Conventionally, there has been proposed a technique of producing a high-quality image from plural images.

For example, Japanese Patent No. 2828138 discloses a method for producing a high-resolution image using plural low-resolution images having position shifts.

US 2004/0126019A1 proposes a technique of dividing RAW data of a Bayer array into each color to perform compression for each color. The data divided into each color has good compression efficiency because of high correlation between adjacent pixels. At this point, when a compression rate is set at a low level in the divided data of the color having many high-frequency components while set at a high level in the pieces of divided data of the other colors, the resolution is maintained and the compression efficiency is improved.

BRIEF SUMMARY OF THE INVENTION

According to a first aspect of the present invention, there is provided an image acquisition apparatus which electronically records an image of a subject, the image acquisition apparatus comprising:

an imager in which a color filter is disposed in a front face;

a RAW data dividing unit configured to divide RAW data into each identical color, the RAW data being obtained in photographing with the imager;

a compression rate control unit configured to enable control of a compression rate for each color in compressing the RAW data divided into each color by the RAW data dividing unit;

a compression coding processing unit configured to produce coded data of each color by compressing the RAW data divided into each color by the RAW data dividing unit at the compression rate controlled by the compression rate control unit;

a recording unit configured to record the coded data of each color produced by the compression coding processing unit;

a RAW format data reproducing unit configured to decode the coded data of each color recorded in the recording unit and reproduce RAW format data from the obtained decoded data; and a motion compensation unit configured to compensate a relative positional relationship between frames by estimating a motion of a subject between frames of a plurality of images using specific color division coded data which is decoded by the RAW format data reproducing unit, the specific color division coded data being coded data of a color close to a peak of spectral sensitivity of human vision in the coded data of each color produced by the compression coding processing unit.

According to a second aspect of the present invention, there is provided an image processing apparatus comprising:

a RAW format data reproducing unit configured to decode coded data of each color to reproduce RAW format data from the obtained decoded data, the coded data of each color being recorded in recording unit and obtained by compressing RAW data divided into each color at a compression rate controlled for each color;

a motion compensation unit configured to compensate a relative positional relationship between frames by estimating a motion of a subject between frames of a plurality of images using specific color division coded data which is decoded by the RAW format data reproducing unit, the specific color division coded data being coded data of a color close to a peak of spectral sensitivity of human vision in the coded data of each color recorded in the recording unit; and a high-resolution processing unit configured to restore a frequency band which is higher than a frequency band during image acquisition, using the subject motion information estimated by the motion compensation unit and the RAW format data reproduced by the RAW format data reproducing unit.

According to a third aspect of the present invention, there is provided an image acquisition system comprising:

an imager in which a color filter is disposed in a front face;

a RAW data dividing unit configured to divide RAW data into each identical color, the RAW data being obtained in image acquisition with the imager;

a compression rate control unit configured to enable control of a compression rate for each color in compressing the RAW data divided into each color by the RAW data dividing unit;

a compression coding processing unit configured to produce coded data of each color by compressing the RAW data divided into each color by the RAW data dividing unit at the compression rate controlled by the compression rate control unit;

a recording unit configured to record the coded data of each color produced by the compression coding processing unit;

a RAW format data reproducing unit configured to decode the coded data of each color recorded in the recording unit and reproduce RAW format data from the obtained decoded data;

a motion compensation unit configured to compensate a relative positional relationship between frames by estimating a motion of a subject between frames of a plurality of images using specific color division coded data which is decoded by the RAW format data reproducing unit, the specific color division coded data being coded data of a color close to a peak of spectral sensitivity of human vision in the coded data of each color produced by the compression coding processing unit; and a high-resolution processing unit configured to restore a frequency band which is higher than a frequency band during the image acquisition, using the subject motion information estimated by the motion compensation unit and the RAW format data reproduced by the RAW format data reproducing unit, wherein an image acquisition apparatus includes at least the imager, the RAW data dividing unit, the compression rate control unit, the compression coding processing unit, and the recording unit, and an image processing apparatus connectable to the image acquisition apparatus includes the above-described means except for the means included within the image acquisition apparatus.

According to a fourth aspect of the present invention, there is provided an image processing program for an image acquisition apparatus which electronically records an image of a subject, the image processing program causing a computer to execute:

dividing RAW data into each identical color, the RAW data being obtained in image acquisition with an imager in which a color filter is disposed in a front face;

controlling a compression rate for each color in compressing the RAW data divided into each color;

producing coded data of each color by compressing the RAW data divided into each color at the controlled compression rate;

recording the produced coded data of each color;

decoding the recorded coded data of each color to reproduce RAW format data from the obtained decoded data; and compensating a relative positional relationship between frames by estimating a motion of a subject between frames of a plurality of images, using decoded specific color division coded data which is coded data of a color close to a peak of spectral sensitivity of human vision in the produced coded data of each color.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing a configuration of an electronic still camera which is an image acquisition apparatus according to a first embodiment of the invention.

FIG. 7 is a view showing a flowchart of image compression processing in FIG. 3.

FIG. 8 is a view for explaining a method for producing RAW data from image compression of each divided color in RAW data reproducing processing.

FIG. 10 is a view for explaining input data of motion estimation processing.

FIG. 16 is a view showing a configuration of an image acquisition system according to a second embodiment of the invention.

FIG. 18 is a view for explaining motion estimation processing using an acceleration sensor.

DETAILED DESCRIPTION OF THE INVENTION

Figure 2:
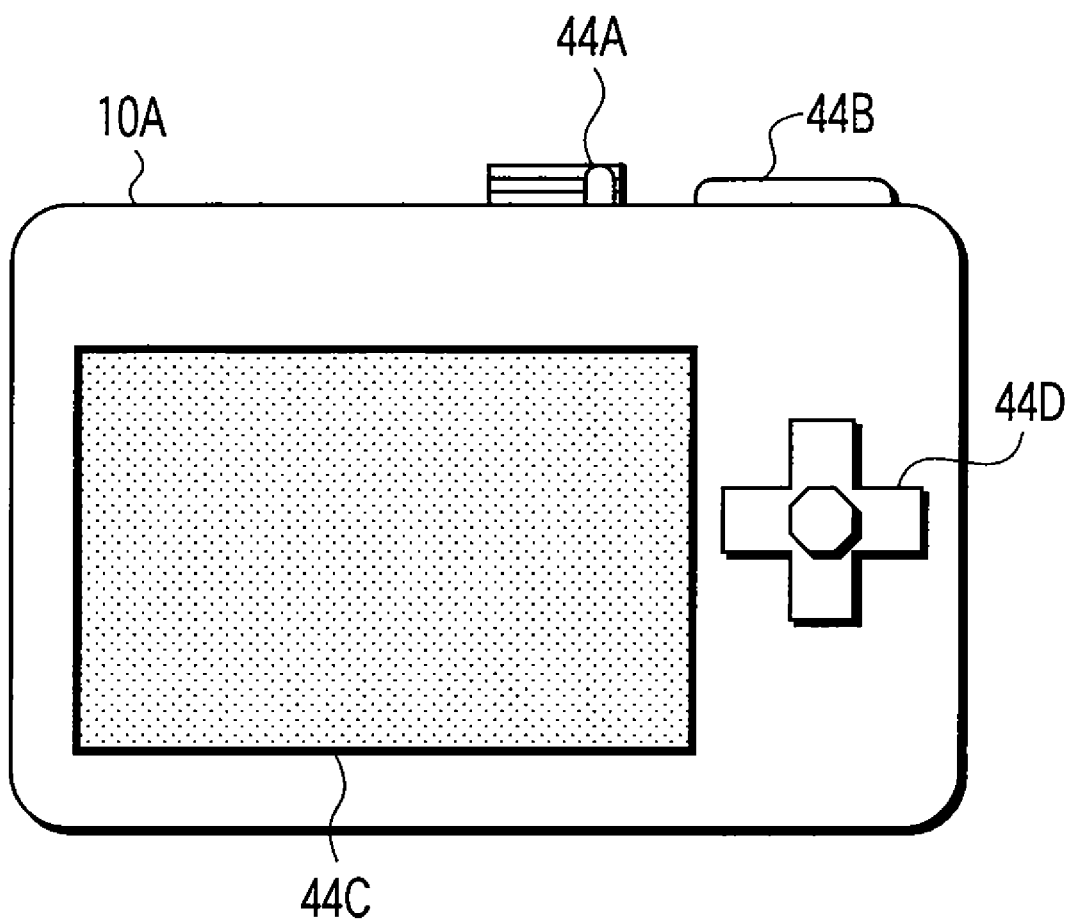
FIG. 2 is a rear view showing a schematic appearance of the electronic still camera in the first embodiment.

Preferred embodiments of the invention will be described below with reference to the drawings.

First Embodiment

As shown in FIG. 1, an electronic still camera 10, which is an image acquisition apparatus according to a first embodiment of the invention, includes a lens system 12 in which a diaphragm 12A is incorporated, a spectral half-mirror system 14, a shutter 16, a lowpass filter 18, a CCD imager 20, an analog-to-digital conversion circuit 22, an AE photosensor 24, an AF motor 26, an image acquisition control unit 28, a first image processing unit 30, an image buffer 32, an image compression and decompression unit 34, a memory card interface unit 36, a memory card 38, an external output interface unit 40, a parameter analysis unit 42, an operation display unit 44, an image acquisition condition setting unit 46, a continuous shooting determination unit 48, a pixel mixing determination unit 50, a switching unit 52, a continuous shooting buffer 54, a second image processing unit 56, and an image dividing and reproducing unit 58.

The lens system 12 in which the diaphragm 12A is incorporated, the spectral half-mirror system 14, the shutter 16, the lowpass filter 18, and the CCD image sensor 20 are disposed along an optical axis. In the first embodiment, it is assumed that a single-plate CCD imager is used as the CCD imager 20. A light flux branched from the spectral half-mirror system 14 is guided to the AE photosensor 24. The AF motor 26 is connected to the lens system 12, and moves a part (focus lens) of the lens system 12 during focusing work.

The analog-to-digital conversion circuit 22 converts a signal from the CCD imager 20 into digital data. The digital data is fed into the image buffer 32 or the continuous shooting buffer 54 through the first image processing unit 30 and the switching unit 52. In the first embodiment, sometimes digital data is fed into image buffer 32 or the continuous shooting buffer 54 not through the first image processing unit 30 but through the switching unit 52. The switching unit 52 performs a switching operation according to an input from the continuous shooting determination unit 48.

Signals are fed into the image acquisition condition setting unit 46 from the analog-to-digital conversion circuit 22 and the AE photosensor 24. A signal is fed from the image acquisition condition setting unit 46 into the image acquisition control unit 28, the continuous shooting determination unit 48, and the pixel mixing determination unit 50. Signals are also fed into the image acquisition control unit 28 from the continuous shooting determination unit 48 and the pixel mixing determination unit 50. The image acquisition control unit 28 controls the diaphragm 12A, the CCD imager 20, and the AF motor 26 based on the signals supplied from the image acquisition condition setting unit 46, the continuous shooting determination unit 48, and the pixel mixing determination unit 50.

The signal can be supplied from the image buffer 32 and the continuous shooting buffer 54 to the second image processing unit 56. The signal can be supplied from the image buffer 32 and the continuous shooting buffer 54 to the image compression and decompression unit 34, and the signal can be fed from the image compression and decompression unit 34 into the image buffer 32 and the continuous shooting buffer 54. The signal can be fed into the image dividing and reproducing unit 58 from the image buffer 32 and the continuous shooting buffer 54, and the signal can be supplied from the image dividing and reproducing unit 58 to the second image processing unit 56. The signal can be supplied from the image dividing and reproducing unit 58 to the image compression and decompression unit 34, and the signal can be fed into the image dividing and reproducing unit 58 from the image compression and decompression unit 34. The second image processing unit 56 includes a motion estimating unit 56A and a super-resolution processing unit 56B. The signal can be supplied from the second image processing unit 56 to the image compression and decompression unit 34 and the operation display unit 44, and the signal can be fed into the second image processing unit 56 from the image compression and decompression unit 34 and the operation display unit 44. The signal can be supplied from the second image processing unit 56 to the memory card interface unit 36 and the external output interface unit 40. The image compression and decompression unit 34 which performs compression such as JPEG and MPEG supplies the signal to the memory card 38 through the memory card interface unit 36. The memory card 38 is detachably attached to the electronic still camera 10. The image compression and decompression unit 34 also supplies the signal to an external image processing apparatus such as a personal computer and a printer through the external output interface unit 40.

As shown in FIG. 2, in the electronic still camera 10, the operation display unit 44 includes a power switch 44A and a release switch 44B which are disposed in a top surface of a camera main body 10A. The operation display unit 44 further includes a liquid crystal display panel 44C and an operation button 44D which are disposed in a rear surface of the camera main body 10A. An operation signal generated by operating each switch of the operation display unit 44 is fed into the memory card interface unit 36, the parameter analysis unit 42, the image acquisition condition setting unit 46, and the second image processing unit 56. The liquid crystal display panel 44C of the operation display unit 44 displays a parameter according to the signal supplied from the parameter analysis unit 42. The signal supplied from the parameter analysis unit 42 is also fed into the image compression and decompression unit 34 and the image acquisition condition setting unit 46.

Figure 3:
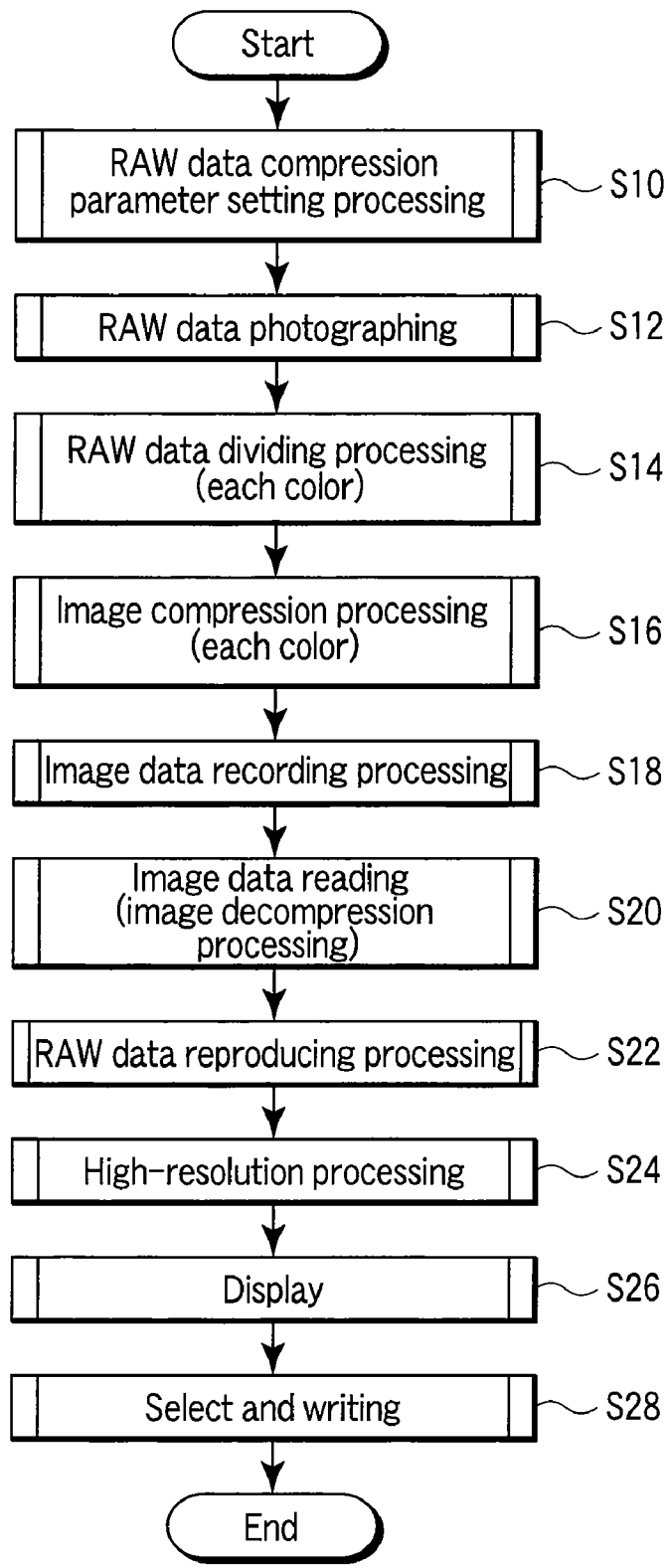
FIG. 3 is a view showing a processing flowchart of the electronic still camera in the first embodiment.

As shown in FIG. 3, in the electronic still camera 10 of the first embodiment, RAW data compression parameter setting processing is performed to set a compression parameter of each color, thereby performing compression rate control (Step S10). The detailed parameter setting technique will be described later.

A user fully presses the release switch 44B to perform RAW data photographing (Step S12). An image signal obtained by the RAW data photographing is retained in the image buffer 32 or the continuous shooting buffer 54.

Then the image dividing and reproducing unit 58 performs RAW data dividing processing (Step S14). In the RAW data dividing processing, the RAW data retained in the image buffer 32 or the continuous shooting buffer 54 is divided into each color. The image compression and decompression unit 34 performs image compression processing on each piece of divided image data by a compression rate controlling method in which the RAW data compression parameter setting processing of Step S10 is used (Step S16). The compressed image data is recorded in the image buffer 32 or the continuous shooting buffer 54 (Step S18).

Figure 4:
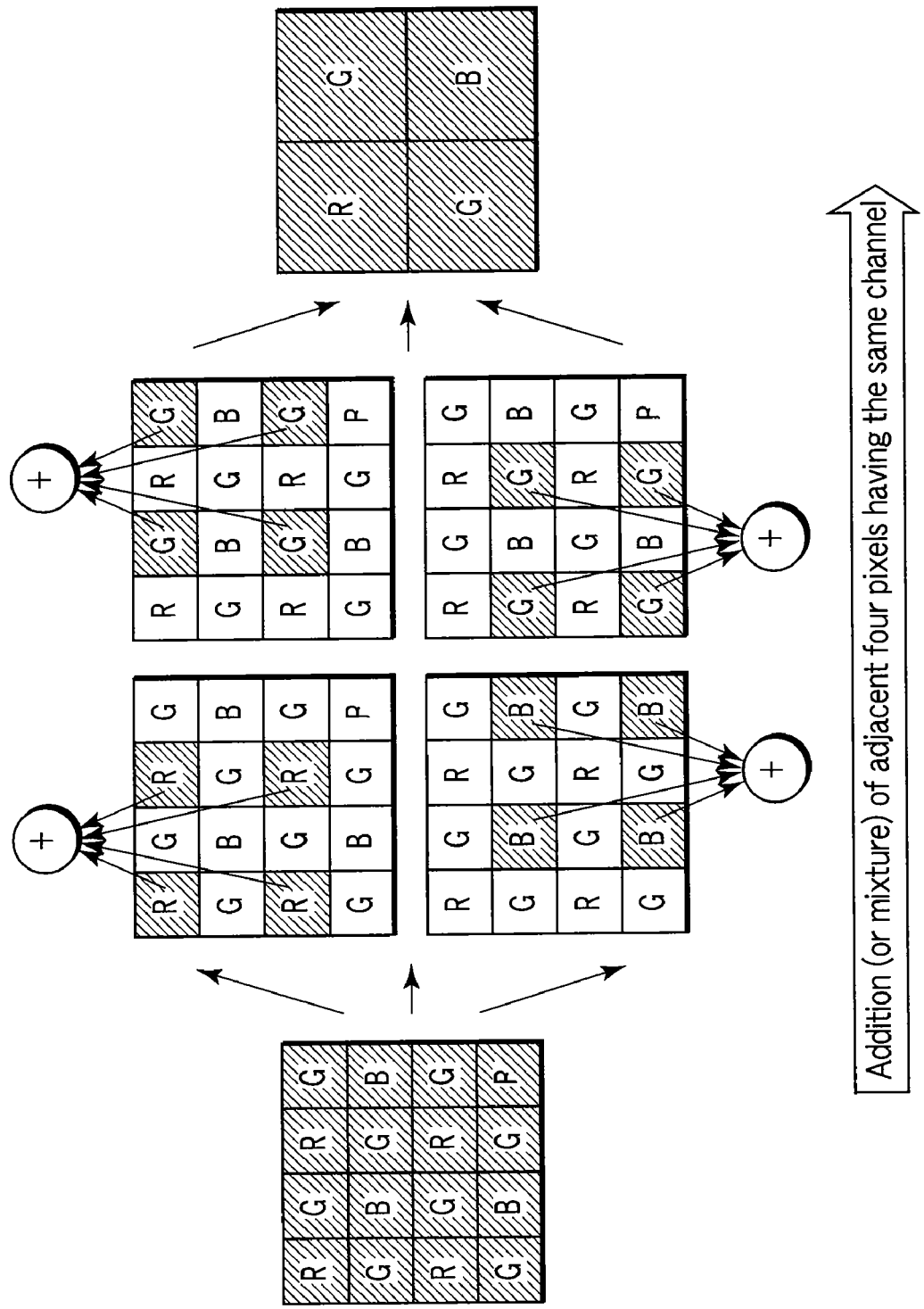
FIG. 4 is a view for explaining pixel mixing read in adjacent four pixels of the same color channel.

Then the image compression and decompression unit 34 performs image decompression processing on the compressed image data recorded in the image buffer 32 or the continuous shooting buffer 54, thereby reading the original image data (Step S20). The image dividing and reproducing unit 58 performs RAW data reproducing processing (Step S22). In the RAW data reproducing processing, RAW format data is reproduced from the read image data. At this point, in addition to usual photographing, sometimes pixel mixing read photographing is performed as the photographing method. In the pixel mixing read photographing, as shown in FIG. 4, the reading is performed while plural pixel signals of the same color channel are added (or mixed) in reading the signal supplied from the CCD imager 20 in which a color filter of the Bayer array is disposed in a front face. In the pixel mixing read photographing, although the image resolution is lowered, the image signal can be read with several-times sensitivity. On the other hand, in usual photographing, the pixel mixing read is not performed, but the signal is read in each pixel in reading the signal supplied from the CCD imager 20 in which a color filter of the Bayer array is disposed in a front face.

The RAW format image signal of the compressed data in which the compression rate is controlled for each color is obtained by performing the pieces of processing on the single or plural photographed images. Then, using the data divided into each color and the single or plural image signals reproduced into the RAW format, the second image processing unit 56, which includes the motion estimating unit 56A and super-resolution processing unit 56B, performs high-resolution processing (Step S24) to produce a high-quality image.

Thus, the high-quality image produced by the second image processing unit 56 is displayed on the liquid crystal display panel 44C of the operation display unit 44 (Step S26), and the high-quality image selected by the user's operation of the operation button 44D is written into the memory card 38 with the memory card interface unit 36 (Step S28). Alternatively, the selected high-quality image is supplied to an external image processing apparatus (not shown) with the external output interface unit 40.

The processing performed in the electronic still camera 10 will further be described based on a data flow.

Figure 5:
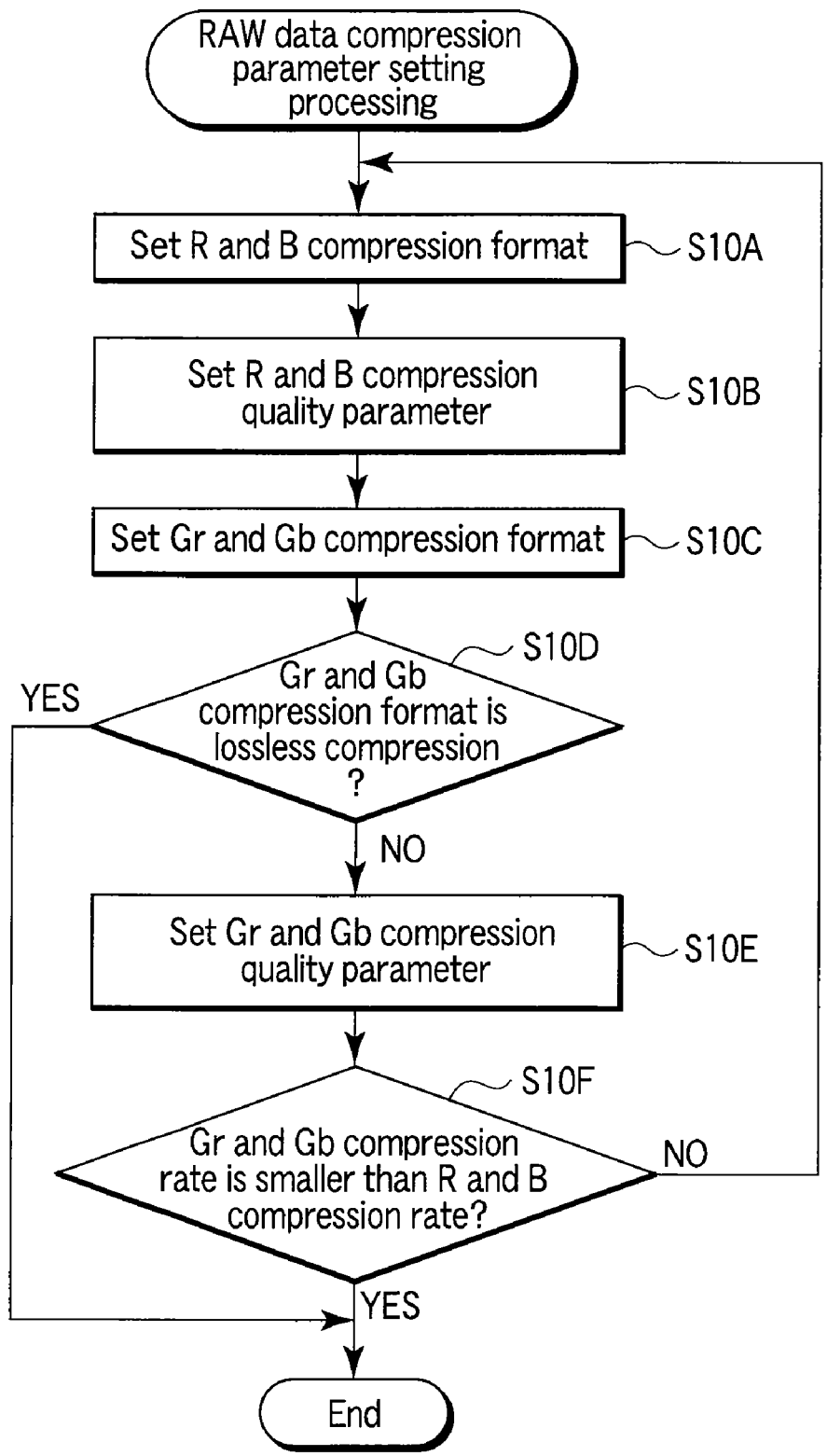
FIG. 5 is a view showing a flowchart of RAW data compression parameter setting processing in FIG. 3.

FIG. 5 shows a procedure for setting a compression parameter for each color relating to the compression control and a RAW data compression parameter setting processing procedure processed according to the compression parameter setting procedure by the parameter analysis unit 42 during use by the user in Step S10. A designer can perform the RAW data compression parameter setting processing during the production of the electronic still camera 10 in order to set manufacturer parameters before shipping.

The designer or the user sets a format for compressing R and B of the RAW data through the operation button 44D according to a setting menu displayed on the liquid crystal display panel 44C (Step S10A), and also sets a compression quality parameter for controlling R and B compression rates (Step S10B). Then the designer or the user sets a format for compressing Gr and Gb of the RAW data (Step S10C). The parameter analysis unit 42 then makes a determination of the set Gr and Gb compression format (Step S10D). When the Gr and Gb compression format is lossless compression, the RAW data compression parameter setting processing is ended.

On the other hand, when the Gr and Gb compression format is lossy compression, the designer or the user is caused to set Gr and Gb compression quality parameters (Step S10E). After the R, Gr, Gb, and B compression formats and the compression quality parameters are set, the determination of the compression rate is made (Step S10F). In the determination of the compression rate, when the Gr and Gb compression rate is smaller than the R and B compression rate, the RAW data compression parameter setting processing is ended. When the Gr and Gb compression rate is larger than the R and B compression rate, the flow returns to the beginning of the RAW data compression parameter setting processing, and the setting is performed again from the setting of the R and B compression format in Step S10A.

The photographing is performed while the RAW data compression parameters are set in the above-described manner. In the first embodiment, the photographing includes pre-photographing and real photographing (RAW data photographing).

When the user partially presses the release switch 44B, or turns on the power switch 44A, the image acquisition control unit 28 controls the diaphragm 12A, the shutter 16, and the AF motor 26 to perform pre-photographing. In the pre-photographing, the analog-to-digital conversion circuit 22 converts the signal supplied from the CCD imager 20 into a digital signal, and the first image processing unit 30 performs well-known white balance processing, highlighting processing, interpolation processing, and the like on the digital signal to supply the processed signal in the form of the three-plate-state image signal to the image buffer 32.

In the pre-photographing, the image acquisition condition setting unit 46 fixes an image acquisition condition for the real photographing, and transfers the fixed image acquisition condition to the image acquisition control unit 28 and the continuous shooting determination unit 48. The image acquisition condition setting unit 46 fixes a photographing mode based on the image acquisition condition fixed by the continuous shooting determination unit 48, and transfers information on the fixed photographing mode to the image acquisition control unit 28 and the switching unit 52. As used herein, the image acquisition condition shall mean a set of setting values with respect to factors such as a shutter speed, an aperture scale, a focusing position, and an ISO speed which are necessary in the photographing.

The image acquisition condition setting unit 46 performs a process of fixing the image acquisition condition by a well-known technique.

The shutter speed and the aperture scale relating to an exposure amount are set based on result in which a light quantity of a subject is measured by the AE photosensor 24 through the lens system 12 and the spectral half-mirror system 14. A region which becomes a measuring target can be switched by an aperture function (not shown) disposed in front of the AE photosensor 24, and a photometric value of the region can be measured by a technique such as spot metering, center-weighted metering, and averaging metering. The combination of the shutter speed and the aperture scale can be selected by an automatic exposure scheme in which the combination of the shutter speed and the aperture scale is previously defined, a shutter speed priority scheme in which the aperture scale is obtained according to the shutter speed set by the user, or an aperture priority scheme in which the shutter speed is obtained according to the aperture scale set by the user.

The luminance data is computed from single-plate-state image data which is digital data converted from the signal supplied from the CCD imager 20 by the analog-to-digital conversion circuit 22, and the focusing position is obtained from edge intensity of the luminance data. That is, the AF motor 26 changes the focusing position of the lens system 12 in a stepwise manner, thereby estimating the focusing position where the edge intensity becomes the maximum.

The ISO speed setting method depends on the setting of a sensitivity mode of the electronic still camera 10. When the sensitivity mode of the electronic still camera 10 is set in a manual sensitivity mode, the ISO speed is set at the setting value of the user. When the sensitivity mode of the electronic still camera 10 is set in an automatic sensitivity mode, the ISO speed is fixed based on the result in which the light quantity of the subject is measured by the AE photosensor 24 through the lens system 12 and the spectral half-mirror system 14. That is, the ISO speed is set at a high value in the case of a small light quantity measured by the AE photosensor 24, and is set at a low value in the case of a large light quantity. The ISO speed in the first embodiment shall mean a value indicating a degree of electric amplification (gain up) with respect to the signal supplied from the CCD imager 20, and the degree of electric amplification is enhanced as the ISO speed is increased.

After the pre-photographing, in the first embodiment, when the release switch 44B is fully pressed to perform the real photographing (RAW data photographing) in Step S12, the analog-to-digital conversion circuit 22 converts the signal supplied from the CCD imager 20 into a digital signal, which is then supplied in the form of a single-plate-state RAW format image signal to the image buffer 32 or the continuous shooting buffer 54 without passing through the first image processing unit 30. Then, in Step S14, the image dividing and reproducing unit 58 divides the single-plate-state RAW format image signal into each color by performing the RAW data dividing processing on the image signal which is supplied to the image buffer 32 or the continuous shooting buffer 54 without performing the processing of the first image processing unit 30.

Figure 6:
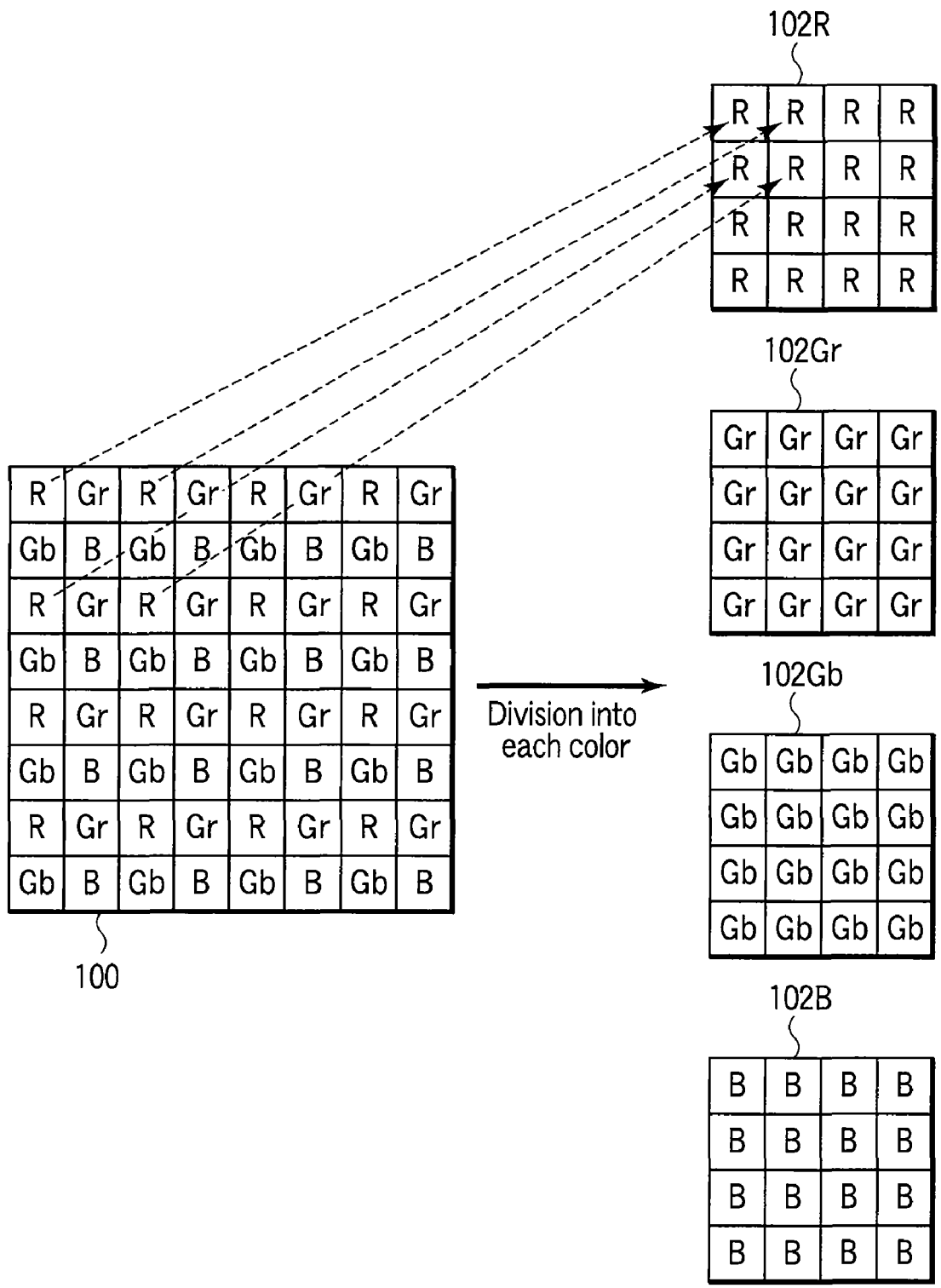
FIG. 6 is a view for explaining a dividing method for each color in RAW data dividing processing.

As shown in FIG. 6, in the method for dividing the image data into each color, pixel information on RAW data 100 is taken out in each color to produce pieces of plain data 102R, 102Gr, 102Gb, and 102B of the colors.

In Step S16, the image compression and decompression unit 34 performs image compression processing on each color plain using the compression format and the compression quality parameter which are set at the image signal divided in each color by the RAW data compression parameter setting processing in Step S10.

As shown in FIG. 7, in the image compression processing, the compression quality parameter is set (Step S16A), and the image data compression processing is performed according to the set compression format (Step S16B). Then, a determination as to whether or not the compression processing is completed for all the colors is made (Step S16C). The compression processing is repeated until the compression processing is completed for all the colors.

Then, in Step S18, the data which is compressed in the above-described manner is retained again in the image buffer 32 or the continuous shooting buffer 54.

In Step S20, the image compression and decompression unit 34 reads the compressed and retained image data while decompressing the image data. In Step S22, the image dividing and reproducing unit 58 produces the RAW format data again.

As shown in FIG. 8, in the RAW format data producing method, the data compressed as a still image in each color is decompresed and RAW format data 100' having the same format as the RAW data 100 is reproduced via an opposite procedure of the division into each color of FIG. 6. The image signal of the reproduced RAW format data 100' is supplied to the image buffer 32 or the continuous shooting buffer 54. The pieces of plain data 102R, 102Gr, 102Gb, and 102B before the compression are identical to the pieces of plain data 102R', 102Gr', 102Gb', and 102B' after the decompression when the compression format is lossless compression.

Figure 9:
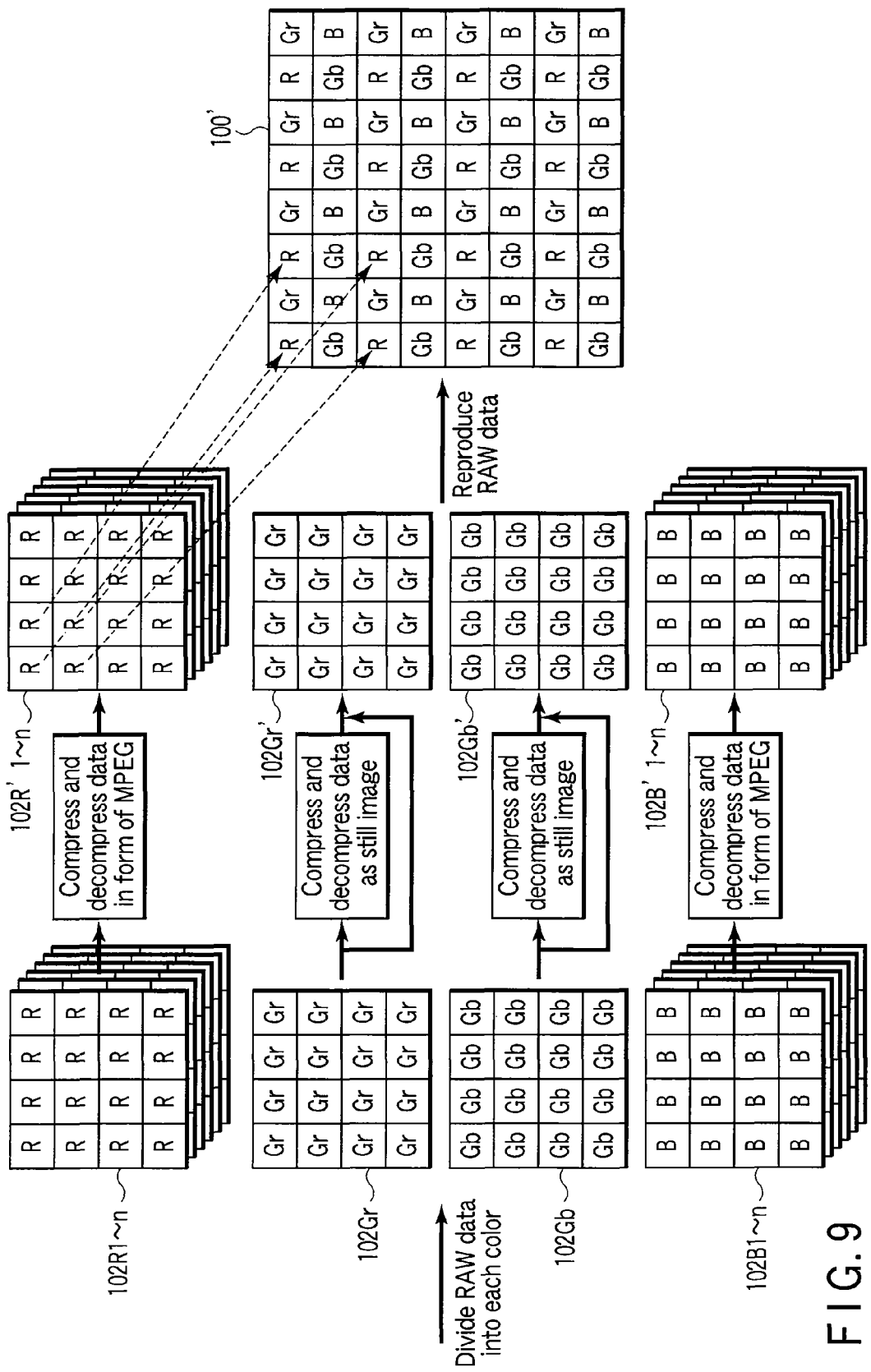
FIG. 9 is a view for explaining another method for producing RAW data from the image compression of each divided color in the RAW data reproducing processing.

A technique shown in FIG. 9 may be adopted as another method for producing the RAW data from the image compression in each divided color in the RAW data reproducing processing. Specific division data (for example, pieces of plain data 102Gr and 102Gb) having a color close to a peak of spectral sensitivity of a human vision is compressed in the form of still image, and other pieces of color division data (for example, pieces of plain data 102R'1 to 102R'$n$ and 102B'1 to 102B'$n$) is compressed in the form of MPEG, and the specific division data and the other pieces of color division data are decompressed to reproduce the RAW format data 100'. The image signal of the reproduced RAW format data 100' is supplied to the image buffer 32 or the continuous shooting buffer 54. The pieces of plain data 102Gr and 102Gb before the compression are identical to the pieces of plain data 102Gr' and 102Gb' after the decompression when the compression format is the lossless compression.

The image signal of the reproduced RAW format data 100' fed into the image buffer 32 or the continuous shooting buffer 54 is fed into the second image processing unit 56. In Step S24, the second image processing unit 56 performs the high-resolution processing on the image signal. Then in Step S26, the high-resolution image signal is displayed on the liquid crystal display panel 44C. In Step S28, the image compression and decompression unit 34 performs a well-known compression processing such as JPEG on the image signal, and the compressed image signal is supplied to the detachable memory card 38 through the memory card interface unit 36. The high-resolution image signal can be supplied to the detachable memory card 38 through the memory card interface unit 36 without performing the compression processing. Additionally, the high-resolution image signal can also be supplied to an external image processing apparatus (not shown) through the external output interface unit 40.

The high-resolution processing performed in Step S24 by the second image processing unit 56 includes motion estimation processing performed by the motion estimating unit 56A and super-resolution processing performed by the super-resolution processing unit 56B. The motion estimation and the super-resolution processing which are performed by the second image processing unit 56 will be described below.

As described above, the image signals (pieces of RAW data 100) of the plural images which are photographed in the continuous shooting mode and fed into the continuous shooting buffer 54 are divided into each color by the image dividing and reproducing unit 58, the divided data is compression-coded by the image compression and decompression unit 34, and the compressed data is supplied to the continuous shooting buffer 54. In the divided and coded data fed into the continuous shooting buffer 54, the image signals of the plural images in the specific division coded data of the color close to the peak of the spectral sensitivity of the human vision is decompressed by the image compression and decompression unit 34 and fed into the second image processing unit 56, and the motion estimating unit 56A of the second image processing unit 56 performs inter-frame motion estimation on each image (frame).

In the first embodiment, as shown in FIG. 10, the input data of the motion estimation processing is one in which the specific division coded data (plain data 102Gr or 102Gb) of the color (for example, G) close to the peak of the spectral sensitivity of the human vision is decompressed to obtain the plain data 102Gr' or 102Gb'. The input data of the motion estimation processing is fed into the motion estimating unit 56A.

Figure 11:
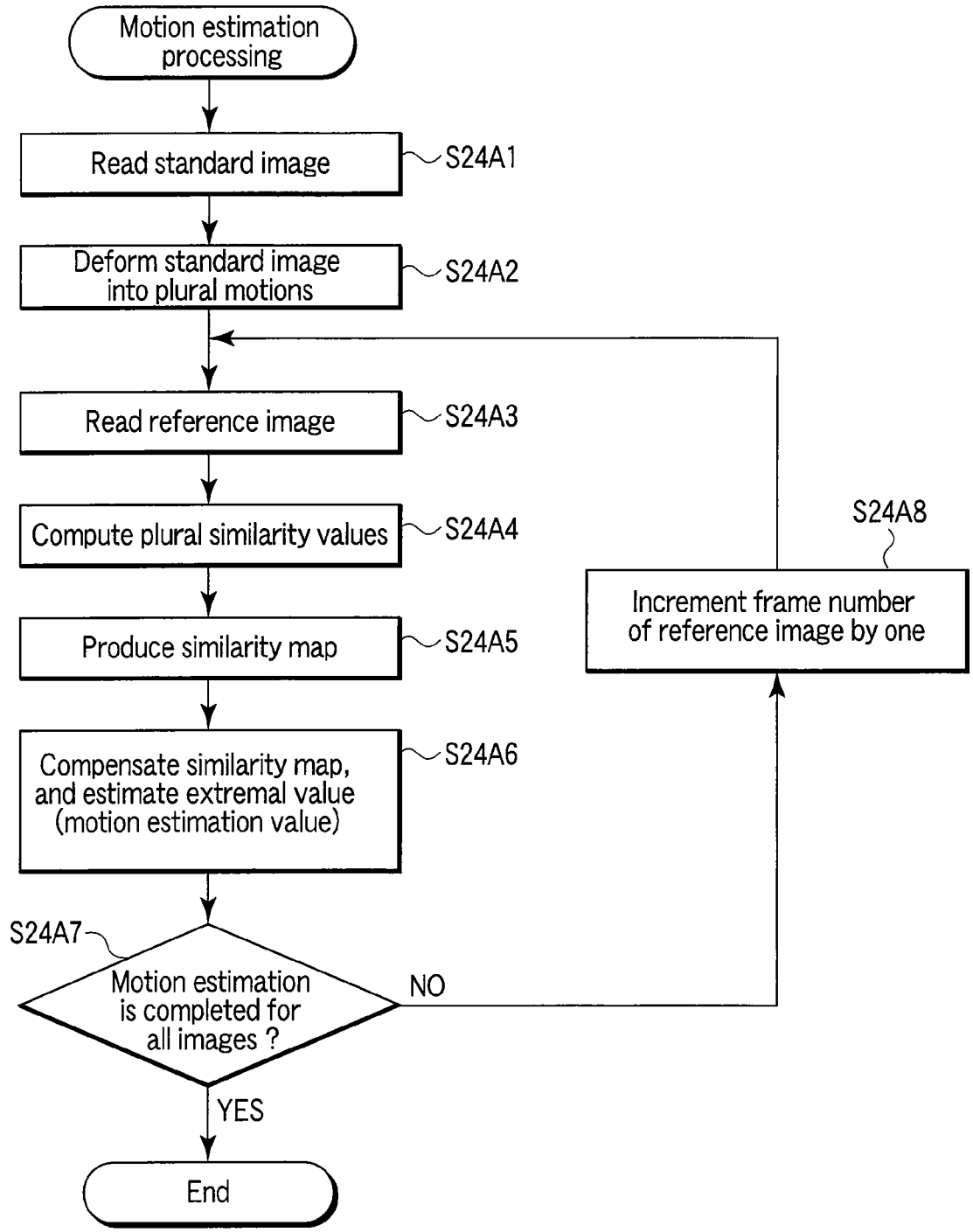
FIG. 11 is a view showing a flowchart of the motion estimation processing performed by a motion estimating unit of a second image processing unit.

As shown in FIG. 11, the motion estimating unit 56A reads one piece of image data (standard image) which becomes a standard of the motion estimation (Step S24A1). The standard image may be initial image data (first frame image) in the pieces of image data of the continuously-photographed plural images, or may be image data (frame) which is arbitrarily specified by the user. Then the read standard image is deformed by plural motions (Step S24A2).

Figure 12:
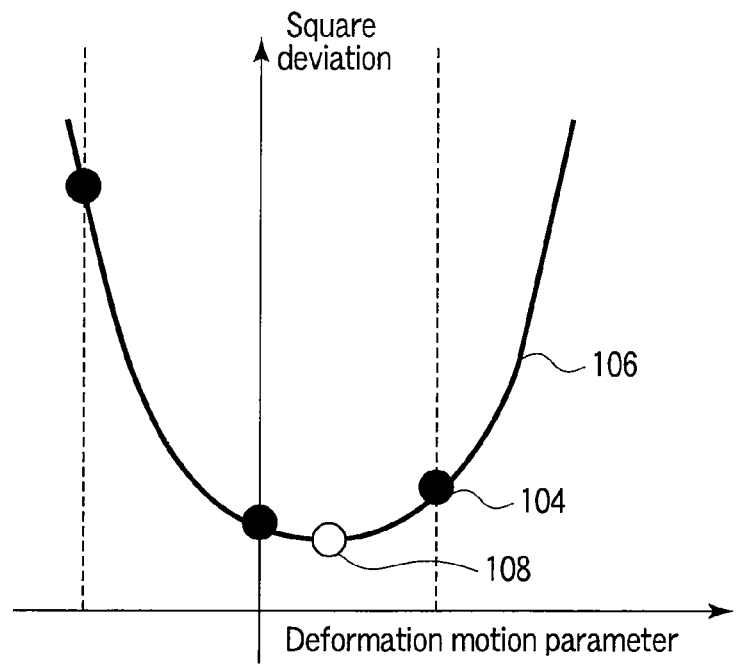
FIG. 12 is a view showing a similarity map for optimum similarity estimation in motion estimation.

Then another piece of image data (reference image) is read (Step S24A3), and a similarity value is computed between the reference image and an image string in which the standard image is deformed into plural motions (Step S24A4). A discrete similarity map is produced as shown in FIG. 12 using a relationship between a parameter of the deformed motion and a computed similarity value 104 (Step S24A5), and a degree of similarity 106 which complements the produced discrete similarity map, that is, the degree of similarity 106 complemented from each computed similarity value 104 is obtained to search for an extremal value 108, thereby obtaining the extremal value (Step S24A6). The motion of the deformation having the obtained extremal value 108 becomes the estimation value. Examples of the method for searching for the extremal value 108 of the similarity map include parabola fitting and spline interpolation.

It is determined whether or not the motion estimation is performed for all the reference images (Step S24A7). When the motion estimation is not performed for all the reference images, a frame number of the reference image is incremented by one (Step S24A8), and the flow returns to Step S24A3. Then the next reference image is read to continue the processing.

When the motion estimation is performed for all the reference images (Step S24A7), the processing is ended.

FIG. 12 is a view showing an example in which the motion estimation is performed by parabola fitting. In FIG. 12, a vertical axis indicates a square deviation, and the similarity is enhanced as the square deviation is decreased.

In the deformation in Step S24A2 of plural motions of the standard image, for example, the standard image is deformed into 19 patterns (eight patterns of 27 patterns are the same deformation pattern) by the motion parameter of ±1 pixel with respect to the horizontal, vertical, and rotation directions. At this point, a horizontal axis of the similarity map of FIG. 12 indicates a deformation motion parameter, the motion parameter of a combination of the horizontal, vertical, and rotation directions is considered by way of example, and discrete similarity values (−1,+1,−1), (−1,+1,0), and (−1,+1,+

1) are plotted from the negative side. Given an individual deformation direction, the discrete similarity values become (−1), (0), and (+1), and are separately plotted in the horizontal, vertical, and rotation directions.

Figure 13A:
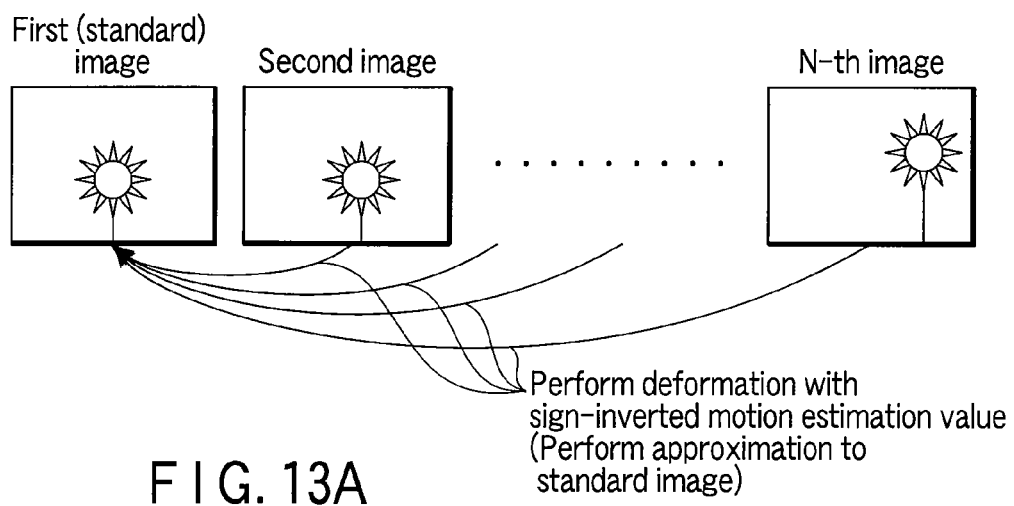
FIG. 13A is a view showing plural continuously-photographed images.
Figure 13B:
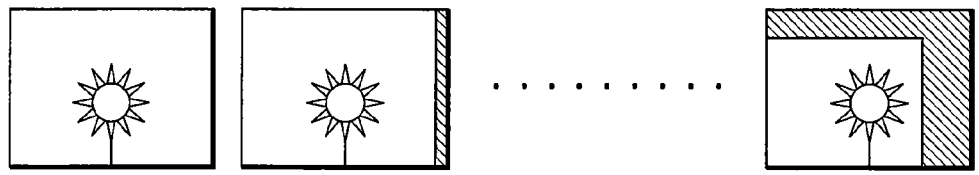
FIG. 13B is a view showing images which are approximated to standard image by reference image deformation in which a motion estimation value is used.

The plural reference images which are continuously photographed as shown in FIG. 13A are deformed by a value in which a sign of the motion estimation value is inverted, whereby the reference images are approximated to a standard image as shown in FIG. 13B.

Figure 14:
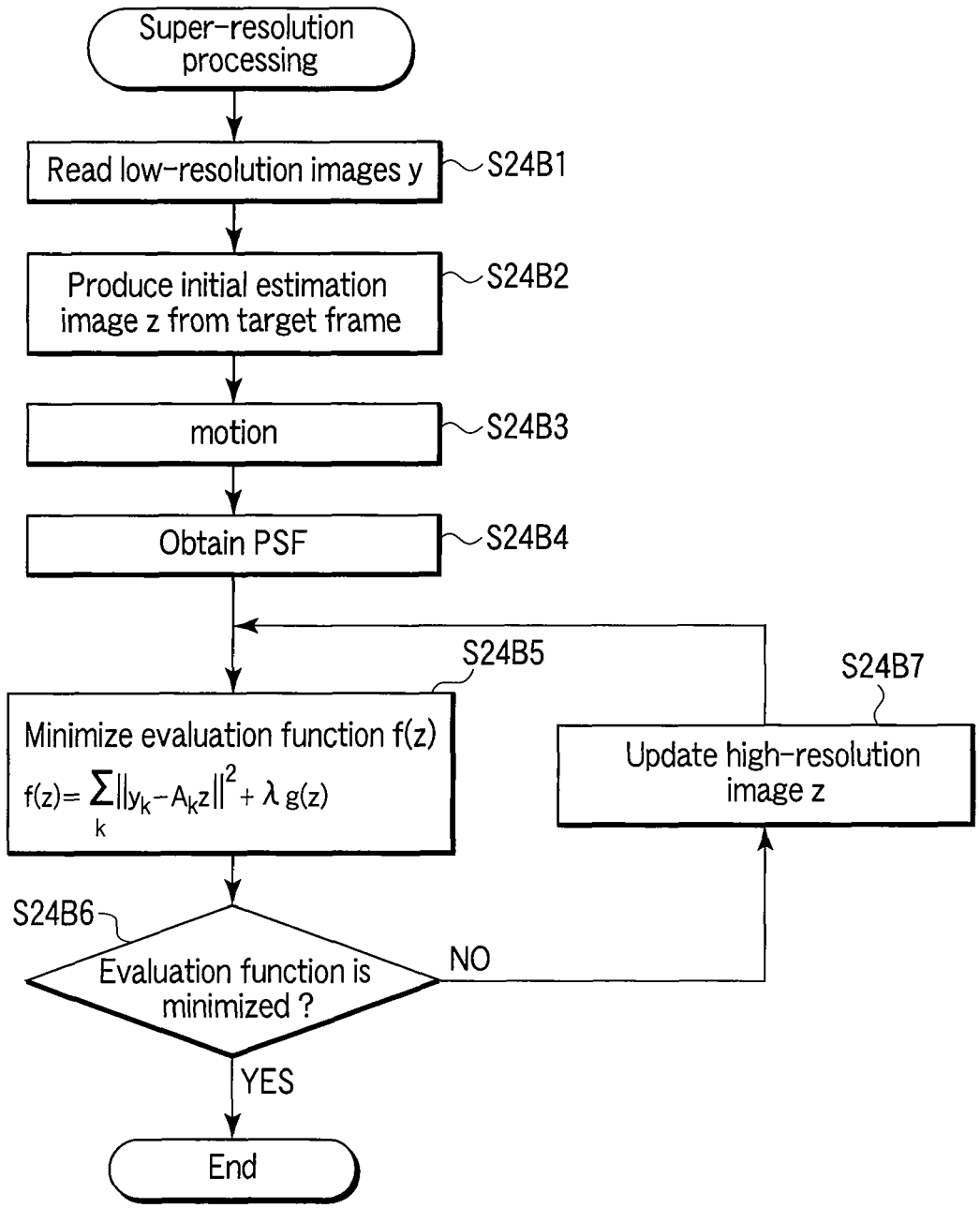
FIG. 14 is a view showing a flowchart of image high-resolution processing (super-resolution processing) performed by a super-resolution processing unit of the second image processing unit.

Next, image high-resolution processing (super-resolution processing) for restoring high-resolution image using plural images, performed by the super-resolution processing unit 56B of the second image processing unit 56, will be described with reference to FIG. 14. The RAW format data 100' which is reproduced from the image compression of each color divided in the above-described manner is used in the image high-resolution processing.

The k (k≧1) pieces of RAW format data 100' (low-resolution images y) are read for high-resolution image estimation (Step S24B1). Any one of the k low-resolution images y is regarded as a target frame, and an initial high-resolution image z is produced by performing interpolation processing (Step S24B2). The processing in Step S24B2 may be omitted.

A positional relationship between images is obtained by inter-frame motion (for example, as described above, the motion estimation value is obtained by the motion estimating unit 56A) between the target frame and other frames, obtained by a certain motion estimation method (Step S24B3). An optical transfer function (OTF) and a point-spread function (PSF) regarding the image acquisition characteristics such as a CCD aperture are obtained (Step S24B4). For example, a Gaussian function is used as PSF.

An evaluation function f(z) is minimized based on information on Step S24B3 and Step S24B4 (Step S24B5). At this point, the evaluation function f(z) is expressed as follows.

$$f(z) = \sum_k \|y_k - A_k z\|^2 + \lambda g(z) \quad \text{[Formula 1]}$$

where y is a low-resolution image, z is a high-resolution image, and A is an image transform matrix indicating an image acquisition system including the inter-image motion (for example, the motion estimation value obtained by the motion estimating unit 56A) and PSF. g(z) is replaced by a restraint term regarding image smoothness and color correlation. λ is a weighted coefficient. A method of steepest descent is used for the minimization of the evaluation function.

It is determined whether or not the evaluation function f(z) obtained in Step S24B5 is minimized (Step S24B6). When the evaluation function f(z) is not minimized, the high-resolution image z is updated (Step S24B7), and the flow returns to Step S24B5.

When the evaluation function f(z) obtained in Step S24B5 is minimized, because the high-resolution image z is obtained, the processing is ended.

Figure 15:
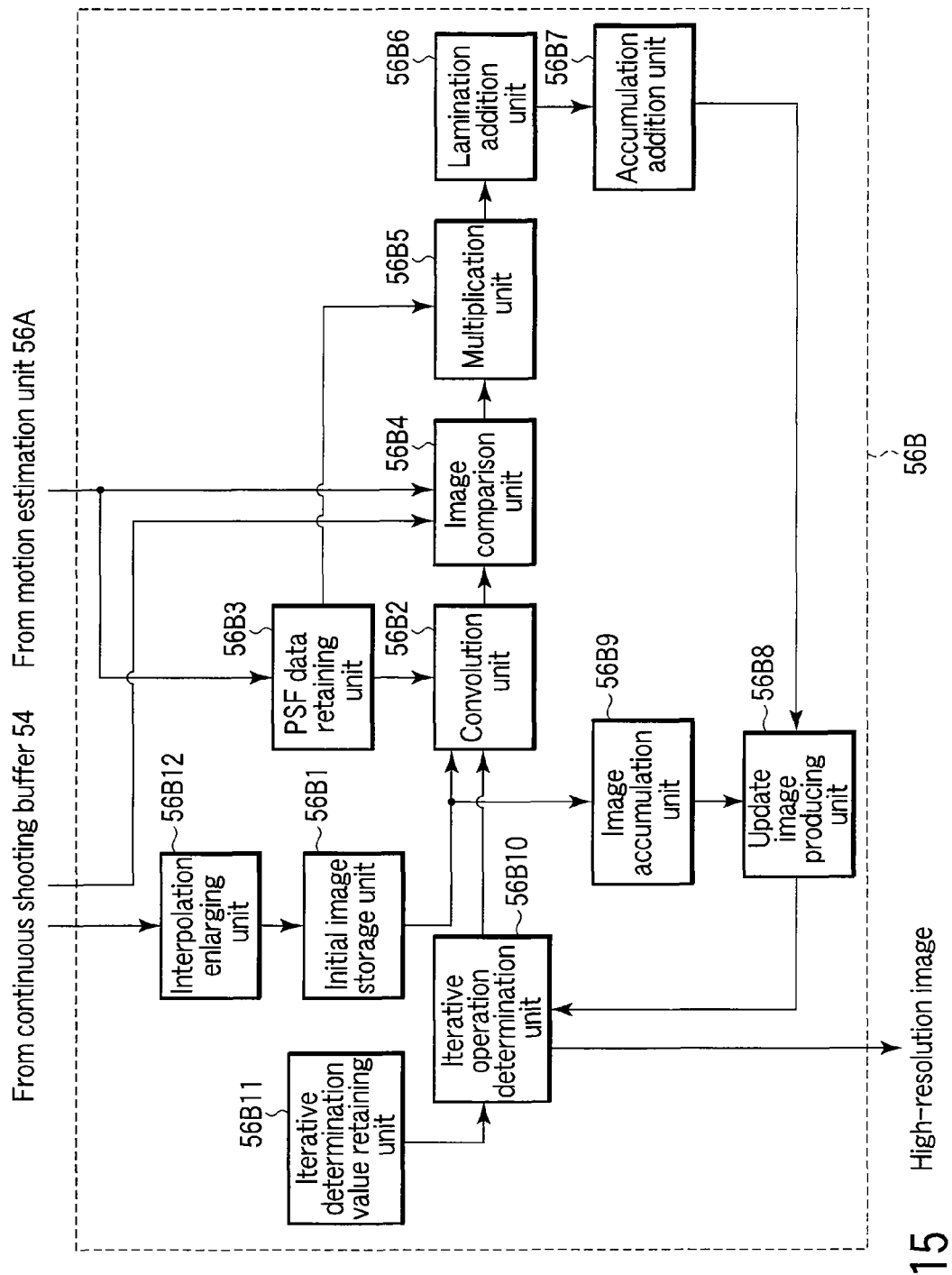
FIG. 15 is a block diagram showing an example of a configuration of the super-resolution processing unit of the second image processing unit.

As shown in FIG. 15, the super-resolution processing unit 56B which performs the super-resolution processing includes an initial image storage unit 56B1, a convolution unit 56B2, a PSF data retaining unit 56B3, an image comparison unit 56B4, a multiplication unit 56B5, a lamination addition unit 56B6, an accumulation addition unit 56B7, an update image producing unit 56B8, an image accumulation unit 56B9, an iterative operation determination unit 56B10, an iterative determination value retaining unit 56B11, and an interpolation enlarging unit 56B12.

The interpolation enlarging unit 56B12 interpolation-enlarges the standard image supplied from the continuous shooting buffer 54, the interpolation enlarging unit 56B12 supplies the interpolation-enlarged image to the initial image storage unit 56B1, and the interpolation-enlarged image is stored as an initial image in the initial image storage unit 56B1. Examples of the interpolation method performed by the interpolation enlarging unit 56B12 include bi-linear interpolation and bi-cubic interpolation.

The initial image data stored in the initial image storage unit 56B1 is supplied to the convolution unit 56B2, which convolves the initial image data along with PSF data supplied from the PSF data retaining unit 56B3. At this point, the PSF data is supplied taking into account the motion in each frame. The initial image data stored in the initial image storage unit 56B1 is simultaneously transmitted to and stored in the image accumulation unit 56B9.

The image data convolved by the convolution unit 56B2 is transmitted to the image comparison unit 56B4. The image comparison unit 56B4 compares the convolved image data to the photographing image supplied from the continuous shooting buffer 54 at a proper coordinate position based on the motion (motion estimation value) of each frame obtained by the motion estimating unit 56A. A residual error of the comparison is transmitted to the multiplication unit 56B5, which multiplies the residual error by a value of each pixel of the PSF data supplied from the PSF data retaining unit 56B3. The operation result is transmitted to the lamination addition unit 56B6, and the values are placed at the corresponding coordinate positions. At this point, the coordinate positions of the pieces of image data supplied from the multiplication unit 56B5 are shifted step by step while overlapping each other, so that addition is performed on the overlapping portion. When the data lamination addition is completed for one photographing image, the data is transmitted to the accumulation addition unit 56B7.

The accumulation addition unit 56B7 accumulates the pieces of data sequentially transmitted until the processing is ended for the frames, and sequentially adds the pieces of image data of the frames according to the estimated motion. The added image data is transmitted to the update image producing unit 56B8. The image data accumulated in the image accumulation unit 56B9 is simultaneously supplied to the update image producing unit 56B8. The update image producing unit 56B8 weights and adds the two pieces of image data to produce update image data.

The update image data produced by the update image producing unit 56B8 is supplied to the iterative operation determination unit 56B10. The iterative operation determination unit 56B10 determines whether or not the operation is repeated based on an iterative determination value supplied from the iterative determination value retaining unit 56B11. When the operation is repeated, the data is transmitted to the convolution unit 56B2 to repeat the series of pieces of processing.

On the other hand, when the operation is not repeated, the update image data which is produced by the update image producing unit 56B8 and fed into the iterative operation determination unit 56B10 is supplied as the high-resolution image.

The resolution of the image supplied from the iterative operation determination unit 56B10 becomes higher than that of the photographing image through this series of pieces of processing.

In the convolution, because the computation at a proper coordinate position is required for the PSF data retained by the PSF data retaining unit 56B3, the motion of each frame is supplied from the motion estimating unit 56A.

As described in detail above, in the first embodiment, the compression efficiency is improved by compression means such that the high-frequency component is destroyed to the least extent possible, so that a recording medium can be saved and a system which does not meet the high-speed and large-capacity write can easily be mounted. Therefore, the burden on the hardware can be reduced, and high-quality image production can be provided.

The motion of the subject is estimated between the frames of the plural images using the specific division coded data of the color close to the peak of spectral sensitivity of human vision. For example, in the case where divided compression image data of G is used as the input image of the motion estimation processing, because only a small amount of data is retained in retaining the input image for the motion estimation processing, the recording medium is saved. The use of specific division coded data such as G which influences the resolution reduces an error of motion estimation accuracy with respect to the case in which motion estimation is performed using the pieces of RAW data of all the colors.

Second Embodiment

In the first embodiment, all the functions are incorporated in the electronic still camera 10 which is the image acquisition apparatus. On the other hand, in a second embodiment of the invention, the functions are divided into an image acquisition apparatus and image processing apparatus which constitute an image acquisition system.

As shown in FIG. 16, a printer 60, which is the image processing apparatus of the second embodiment, is connected to a camera main body 10A of the electronic still camera 10. The camera main body 10A includes lens system 12, spectral half-mirror system 14, shutter 16, lowpass filter 18, CCD imager 20, analog-to-digital conversion circuit 22, AE photosensor 24, AF motor 26, image acquisition control unit 28, first image processing unit 30, image buffer 32, a function of performing image compression processing in image compression and decompression unit 34, FIG. 1 memory card interface unit 36, memory card 38, external output interface unit 40, parameter analysis unit 42, operation display unit 44, image acquisition condition setting unit 46, continuous shooting determination unit 48, pixel mixing determination unit 50, switching unit 52, continuous shooting buffer 54, and a function of performing image dividing processing in image dividing and reproducing unit 58 in the configuration of FIG. 1. The printer 60 connected to the camera main body 10A through the external output interface unit 40 includes a function of performing image decompression processing in image compression and decompression unit 34, second image processing unit 56 and a function of performing reproducing processing on the RAW format data in image dividing and reproducing unit 58.

In the above-described configuration, the electronic still camera 10 acquires plural images, performs division and compression on each color, and records the image data, and the printer 60 performs motion estimation processing, RAW format data reproducing processing, and super-resolution processing.

The super-resolution of the whole image applies a large burden on the hardware and greatly increases the processing time. In the second embodiment, in the case where the electronic still camera 10 and the printer 60 are connected, the motion estimation processing and the super-resolution processing are performed on the side of the printer 60 when the user issues a print instruction through a user interface (operation display unit 44) of the electronic still camera 10, and the hardware performance of the printer 60 is utilized when the high-resolution image is printed. Accordingly, the processing can be performed faster than the processing performed in the electronic still camera 10. From the viewpoint of the waiting time of the user, because the processing that includes super-resolution processing is performed while waiting for printing, the high resolution-related processing time creates no problem.

The distinction in the functions between the electronic still camera 10 and the printer 60 is not limited to the second embodiment. For example, the motion estimation processing may also be performed by the electronic still camera 10.

The image processing apparatus is not limited to the printer 60, and may be a personal computer, a viewer (storage viewer), a monitor, a projector, a recorder (DVD and CD), and a player, which can be connected to the external output interface unit 40, for example.

Third Embodiment

An electronic still camera 10, on which an acceleration sensor is mounted to correct camera shake during photographing, is well known.

Figure 17:
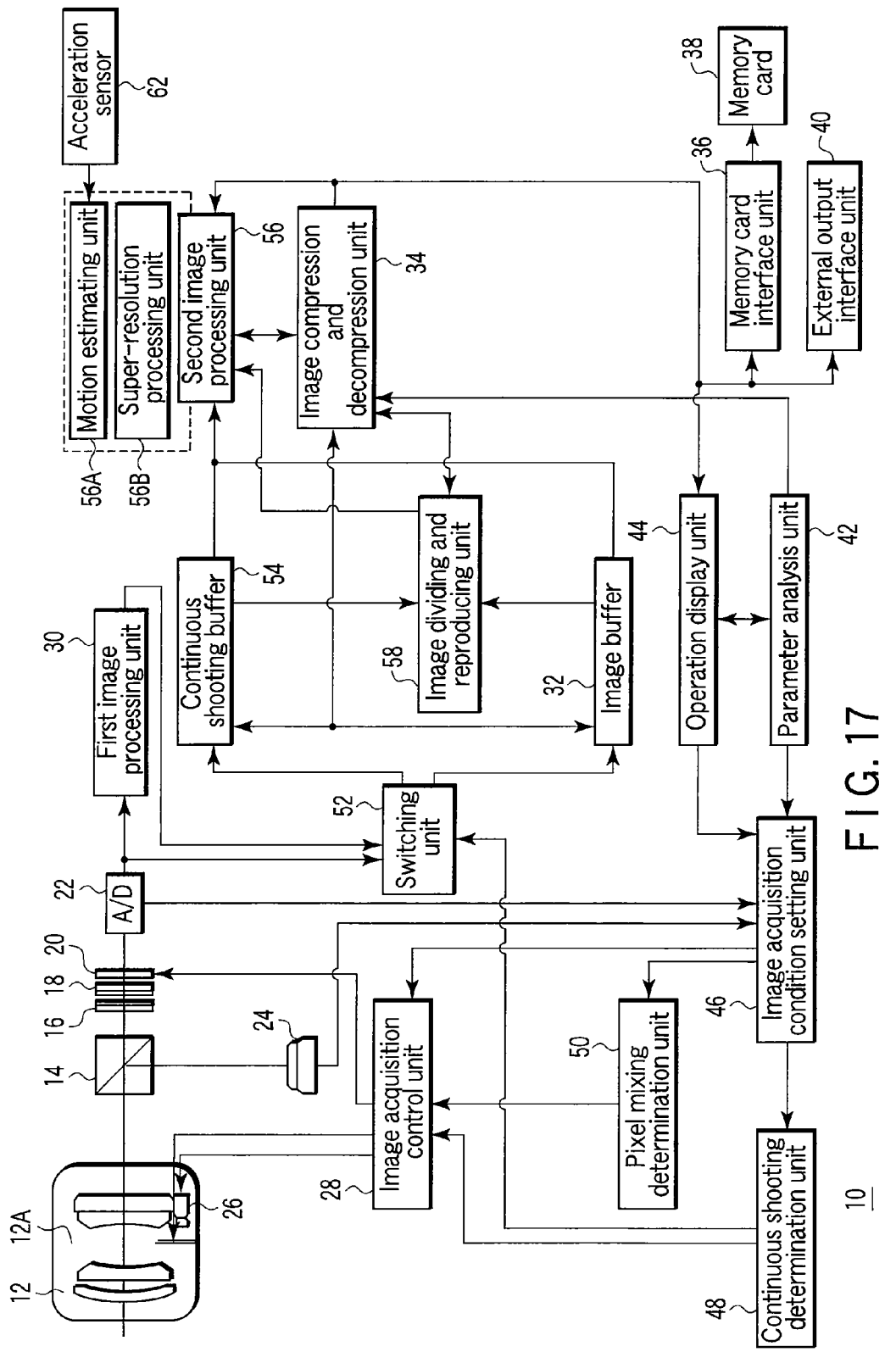
FIG. 17 is a block diagram showing a configuration of an electronic still camera which is an image acquisition apparatus according to a third embodiment of the invention.

As shown in FIG. 17, in the electronic still camera 10 which is an image acquisition apparatus according to a third embodiment of the invention, an output of an acceleration sensor 62 is also supplied to the motion estimating unit 56A of the second image processing unit 56, and estimation is performed in the motion estimation performed by the motion estimating unit 56A while the output of the acceleration sensor 62 is concurrently utilized.

In the case where the acceleration sensor is not used, it is necessary that an estimation kernel region be enlarged in the motion estimation processing as the amount of camera shake of the user is increased in the photographing with the electronic still camera 10, which results in increased processing time.

However, as shown in FIG. 18, when the reference image is deformed in the opposite direction by an amount detected by the acceleration sensor 62, the reference image is substantially approximated to the standard image, and the motion estimation value can be accurately obtained in a short time by performing motion estimation processing in which the image processing is performed on a small region.

Thus, the invention has been described above based on the embodiments. The invention is not limited to the embodiments, and obviously various modifications and applications can be made without departing from the scope of the invention.

For example, the image high-resolution processing (super-resolution processing) for restoring a high-resolution image using plural low-resolution images (pieces of image data) has been described in the embodiments. However, a high-resolution image can also be restored using one low-resolution image.

A software program for realizing the functions of the embodiments is supplied to a computer, and the computer executes the program using the low-resolution image stored in the memory, which allows the functions to be realized.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An image acquisition apparatus which electronically records an image of a subject, the image acquisition apparatus comprising:
   an imager in which a color filter is disposed in a front face;
   a RAW data dividing unit configured to divide RAW data into each identical color, the RAW data being obtained in photographing with the imager;
   a compression rate control unit configured to enable control of a compression rate for each color in compressing the RAW data divided into each color by the RAW data dividing unit;
   a compression coding processing unit configured to produce coded data of each color by compressing the RAW data divided into each color by the RAW data dividing unit at the compression rate controlled by the compression rate control unit;
   a recording unit configured to record the coded data of each color produced by the compression coding processing unit;
   a RAW format data reproducing unit configured to decode the coded data of each color recorded in the recording unit and reproduce RAW format data from the obtained decoded data; and
   a motion compensation unit configured to compensate a relative positional relationship between frames by estimating a motion of a subject between frames of a plurality of images using specific color division coded data which is decoded by the RAW format data reproducing unit, the specific color division coded data being coded data of a color close to a peak of spectral sensitivity of human vision in the coded data of each color produced by the compression coding processing unit.

2. The image acquisition apparatus according to claim 1, wherein the compression coding processing unit enables to select one of compression coding processing techniques for each color, the compression coding processing techniques including a JPEG-compliant compression algorithm, an MPEG-compliant compression algorithm, and a compression algorithm capable of lossless compression.

3. The image acquisition apparatus according to claim 2, wherein, when the compression coding processing unit produces the specific color division coded data, the compression rate control unit lowers a compression rate of the specific color division coded data compared with compression rates of other pieces of specific color division coded data in the case where the selected compression coding processing technique is not the compression algorithm capable of the lossless compression.

4. The image acquisition apparatus according to claim 1, wherein the RAW format data reproducing unit produces RAW format data having a format identical to a format of the RAW data before being divided by the RAW data dividing unit.

5. The image acquisition apparatus according to claim 1, further comprising a high-resolution processing unit configured to restore a frequency band which is higher than a frequency band during the image acquisition, using the subject motion information estimated by the motion compensation unit and the RAW format data reproduced by the RAW format data reproducing unit.

6. The image acquisition apparatus according to claim 5, further comprising a monitor configured to enable display at least a part of a region of an image acquisition screen, wherein the high-resolution processing unit performs the high-resolution processing on image data of the region displayed on the monitor from the RAW format data reproduced by the RAW format data reproducing unit, and image data having a size corresponding to a display size of the monitor in the obtained pieces of image data is displayed on the monitor.

7. The image acquisition apparatus according to claim 5, wherein the high-resolution processing unit includes an image synthesizing unit configured to produce an image in which a plurality of frames are synthesized, that plurality of frames being compensated by the motion compensation unit.

8. The image acquisition apparatus according to claim 7, further comprising a monitor configured to enable display at least a part of a region of an image acquisition screen, wherein the high-resolution processing unit performs the high-resolution processing on image data of the region displayed on the monitor from the RAW format data reproduced by the RAW format data reproducing unit, and image data having a size corresponding to a display size of the monitor in the obtained pieces of image data is displayed on the monitor.

9. An image processing apparatus comprising:
   a RAW format data reproducing unit configured to decode coded data of each color to reproduce RAW format data from the obtained decoded data, the coded data of each color being recorded in recording unit and obtained by compressing RAW data divided into each color at a compression rate controlled for each color;
   a motion compensation unit configured to compensate a relative positional relationship between frames by estimating a motion of a subject between frames of a plurality of images using specific color division coded data which is decoded by the RAW format data reproducing unit, the specific color division coded data being coded data of a color close to a peak of spectral sensitivity of human vision in the coded data of each color recorded in the recording unit; and
   a high-resolution processing unit configured to restore a frequency band which is higher than a frequency band during image acquisition, using the subject motion information estimated by the motion compensation unit and the RAW format data reproduced by the RAW format data reproducing unit.

10. An image acquisition system comprising:
    an imager in which a color filter is disposed in a front face;
    a RAW data dividing unit configured to divide RAW data into each identical color, the RAW data being obtained in image acquisition with the imager;
    a compression rate control unit configured to enable control of a compression rate for each color in compressing the RAW data divided into each color by the RAW data dividing unit;
    a compression coding processing unit configured to produce coded data of each color by compressing the RAW data divided into each color by the RAW data dividing unit at the compression rate controlled by the compression rate control unit;
    a recording unit configured to record the coded data of each color produced by the compression coding processing unit;
    a RAW format data reproducing unit configured to decode the coded data of each color recorded in the recording unit and reproduce RAW format data from the obtained decoded data;
    a motion compensation unit configured to compensate a relative positional relationship between frames by estimating a motion of a subject between frames of a plurality of images using specific color division coded data which is decoded by the RAW format data reproducing unit, the specific color division coded data being coded data of a color close to a peak of spectral sensitivity of human vision in the coded data of each color produced by the compression coding processing unit; and a high-resolution processing unit configured to restore a frequency band which is higher than a frequency band during the image acquisition, using the subject motion information estimated by the motion compensation unit and the RAW format data reproduced by the RAW format data reproducing unit, wherein an image acquisition apparatus includes at least the imager, the RAW data dividing unit, the compression rate control unit, the compression coding processing unit, and the recording unit, and an image processing apparatus connectable to the image acquisition apparatus includes the above-described means except for the means included within the image acquisition apparatus.

11. An image processing program located on a non-transitory computer readable medium for an image acquisition apparatus which electronically records an image of a subject, the image processing program causing a computer to execute:

dividing RAW data into each identical color, the RAW data being obtained in image acquisition with an imager in which a color filter is disposed in a front face;

controlling a compression rate for each color in compressing the RAW data divided into each color;

producing coded data of each color by compressing the RAW data divided into each color at the controlled compression rate;

recording the produced coded data of each color;

decoding the recorded coded data of each color to reproduce RAW format data from the obtained decoded data; and compensating a relative positional relationship between frames by estimating a motion of a subject between frames of a plurality of images, using decoded specific color division coded data which is coded data of a color close to a peak of spectral sensitivity of human vision in the produced coded data of each color.

* * * * *